US010118771B2

(12) United States Patent
Itoh et al.

(10) Patent No.: US 10,118,771 B2
(45) Date of Patent: Nov. 6, 2018

(54) CONVEYOR DEVICE, CONVEYOR SYSTEM, ZONE CONTROLLER, CAD DEVICE, AND METHOD FOR MANUFACTURING CONVEYOR DEVICE

(71) Applicant: ITOH DENKI CO., LTD., Kasai-shi, Hyogo (JP)

(72) Inventors: Kazuo Itoh, Kasai (JP); Toshiyuki Tachibana, Himeji (JP); Akira Takanaga, Himeji (JP); Yoshiyuki Kujihashi, Kato (JP)

(73) Assignee: Itoh Denki Co. (JP)

( * ) Notice: Subject to any disclaimer, the term of this patent is extended or adjusted under 35 U.S.C. 154(b) by 0 days.

(21) Appl. No.: 15/312,243

(22) PCT Filed: Nov. 16, 2015

(86) PCT No.: PCT/JP2015/082163
§ 371 (c)(1),
(2) Date: Nov. 18, 2016

(87) PCT Pub. No.: WO2016/080362
PCT Pub. Date: May 26, 2016

(65) Prior Publication Data
US 2017/0101273 A1     Apr. 13, 2017

(30) Foreign Application Priority Data

Nov. 18, 2014 (JP) ................................. 2014-233435

(51) Int. Cl.
*B65G 43/08* (2006.01)
*B65G 13/07* (2006.01)
(Continued)

(52) U.S. Cl.
CPC ............. *B65G 43/08* (2013.01); *B65G 13/07* (2013.01); *B65G 13/08* (2013.01); *B65G 43/10* (2013.01); *B65G 47/54* (2013.01); *B65G 47/766* (2013.01)

(58) Field of Classification Search
CPC ........ B65G 13/07; B65G 13/08; B65G 43/10; B65G 47/54; B65G 47/766
(Continued)

(56) References Cited

U.S. PATENT DOCUMENTS 5,460,257 A * 10/1995 Yoshida ................. B65G 37/02
198/358
6,827,202 B2 * 12/2004 Topmiller ............ B65G 47/261
198/781.05
(Continued)

FOREIGN PATENT DOCUMENTS

| JP | 5-77915 A | 3/1993 |
| JP | 6-293426 A | 10/1994 |

(Continued)

OTHER PUBLICATIONS

International Preliminary Report on Patentability and Written Opinion, dated May 23, 2017, in Appln. No. PCT/JP2015/082163.
(Continued)

*Primary Examiner* — Douglas A Hess
(74) *Attorney, Agent, or Firm* — Wood, Phillips, Katz, Clark & Mortimer

(57) ABSTRACT

An object is to provide a conveyor that enables the number of information read-out devices to be largely reduced and that can be easily constructed. An object identifying device (45) is installed in the first zone. The object identifying device (45) is a bar code reader. Information read by the bar code reader is transmitted to a host control device (46). The host control device (46) identifies an object from informa-
(Continued)

tion described in a bar code, makes an inquiry about a conveyance destination of an object, transmits the address of the target place to a zone controller (10) of the second zone, and inputs the address to a conveyance destination storage unit of the zone controller (10) of the second zone. The conveyance destination information input to the conveyance destination storage unit is passed on to the downstream zone controller (10) with the conveyance of the object.

27 Claims, 18 Drawing Sheets

(51) Int. Cl.
*B65G 47/54* (2006.01)
*B65G 43/10* (2006.01)
*B65G 47/76* (2006.01)
*B65G 13/08* (2006.01)

(58) Field of Classification Search
USPC ....... 198/357, 358, 364, 367, 575, 576, 577, 198/783; 700/230
See application file for complete search history.

(56) References Cited

U.S. PATENT DOCUMENTS

| | | | | |
|---|---|---|---|---|
| 7,026,732 B1* | 4/2006 | Backman | ............... | H02K 41/03 104/292 |
| 7,542,823 B2* | 6/2009 | Nagai | ................... | B65G 43/10 198/460.1 |
| 7,591,365 B2* | 9/2009 | Knepple | ............... | B65G 37/02 198/460.1 |
| 7,996,104 B2* | 8/2011 | Wielebski | ............. | B65G 37/02 198/781.06 |
| 8,042,681 B2* | 10/2011 | Chuang | ................ | B65G 47/261 193/37 |
| 8,186,499 B2* | 5/2012 | Brandt | ................... | B65G 43/00 198/341.01 |
| 8,396,587 B2* | 3/2013 | Saitou | ................ | G05B 19/4189 700/230 |
| 8,499,920 B2* | 8/2013 | Ogawa | .................... | G06M 7/04 198/358 |
| 8,550,234 B2* | 10/2013 | Breen | .................... | B65G 43/10 198/460.1 |
| 8,757,363 B2* | 6/2014 | Combs | ................... | B65G 43/10 198/349 |
| 8,763,788 B2* | 7/2014 | Neiser | ................. | B65G 47/268 198/617 |
| 9,037,290 B2* | 5/2015 | Neiser | .................... | B65G 43/10 370/397 |
| 9,446,907 B2* | 9/2016 | Tachibana | .............. | B65G 43/00 |
| 9,446,908 B2* | 9/2016 | Danelski | ................ | B65G 43/08 |
| 2009/0099686 A1 | 4/2009 | Yoshikawa et al. | | |
| 2012/0004766 A1 | 1/2012 | Stoll et al. | | |

FOREIGN PATENT DOCUMENTS

| | | |
|---|---|---|
| JP | 7-285661 A | 10/1995 |
| JP | 2002-370828 A | 12/2002 |
| JP | 2005-231745 A | 9/2005 |
| JP | 2006-312514 A | 11/2006 |
| JP | 2007-317079 A | 12/2007 |
| JP | 2012-211015 A | 11/2012 |
| JP | 2013-230914 A | 11/2013 |

OTHER PUBLICATIONS

International Search Report for International Patent Appln. No. PCT/JP2015/082163, date Feb. 9, 2016.

* cited by examiner

R.No,11          No,12          F.No,13
                 SPEED 3

R.No,17          No,18          F.No,89
                 SPEED 2
                 R.T.No,19

CONVEYOR DEVICE, CONVEYOR SYSTEM, ZONE CONTROLLER, CAD DEVICE, AND METHOD FOR MANUFACTURING CONVEYOR DEVICE

TECHNICAL FIELD

The present invention relates to conveyors such as a roller conveyor and a belt conveyor. In particular, the present invention relates to a conveyor in which a conveying passage is divided into a plurality of short zones, the conveying passage is divided into a plurality of branch conveying passages, and there are a plurality of target places to which objects are conveyed. The present invention also relates to a zone controller that controls the zone of the conveyor. The present invention also relates to a conveying module. The present invention also relates to a conveyor system. The present invention also relates to a CAD device used for designing the conveyor and a method for manufacturing the conveyor.

BACKGROUND ART

A conveyor is often installed in a delivery center, a pickup point, or a warehouse. For example, in the delivery center, it is necessary to assort objects according to delivery destinations. Thus, in the conveyor installed in the delivery center, a conveying passage is divided into many branch conveying passages. That is, the conveyor installed in the delivery center often includes a plurality of delivery target places.

In the conveyor installed in the delivery center, a plurality of primary branch conveying passages branch of from a main conveying passage. Further, secondary branch conveying passages and tertiary branch conveying passages further branch off from the primary branch conveying passages.

The conveyor installed in the delivery center includes a plurality of straight conveying passages which constitute the main conveying passage, the primary branch conveying passage and the secondary branch conveying passage, and a conveying direction changing device which changes a conveying direction. The conveying direction changing device is disposed in a branching point.

When objects are conveyed using a conventional conveyor, a storage medium such as a bar code or an IC tag in which information of a conveyance destination (target place) is written is attached to each of the objects. Further, an information read-out device is disposed on each branching point to read the conveyance destination of an object, and the conveying direction changing device is operated to send out the object to a predetermined conveying passage.

There is known a continuous conveyor that includes many zones (Patent Document 2).

In the conveyor disclosed in Patent Document 2, a zone controller is provided in each zone, and a motor of each zone is controlled by the zone controller.

Further, there is also known a conveyor that includes a zone having a branching function (Patent Document 3).

In the conventional technique, in the zone having a branching function, a branching operation is performed upon receiving a signal from the outside.

That is, the zone having a branching function has the function of moving an object straight forward and discharging an object in the lateral direction.

These operations are executed by operating a plurality of motors in a predetermined order. In the conventional technique, the motors are sequentially operated in response to signals from the outside.

Specifically, the zone having a branching function is controlled by a programmable logic computer (PLC).

PRIOR ART DOCUMENTS

Patent Documents

Patent Document 1: JP 2005-231745 A
Patent Document 2: JP 2012-211015 A
Patent Document 3: JP 2013-230914 A

DISCLOSURE OF INVENTION

Technical Problem

In the conventional conveyor, it is necessary to provide the information read-out device in each branching point. Thus, the conventional conveyor includes a large number of components. Further, a construction work to change the layout of the conveyor or to install a new conveyor is complicated. In addition, a large number of programmable logic computers (PLCs) are required in the conventional conveyor.

In view of the above problems, it is an object of the present invention to provide a conveyor that enables the number of information read-out devices and the number of PLCs to be largely reduced and that can be easily constructed.

Solution to Problem

An aspect for solving the above problems is a conveyor for conveying an object from a start position to a target place, the conveyor including: a plurality of zones into which the conveyer is divided, the object being conveyed across the zones; at least one object identifying device; and an initial information transmitting unit transmitting a conveyance destination information of the object itself to any of the zones, each of the zones including: a linear conveying zone that linearly conveys the object; a conveying direction changing zone selecting a conveying direction of the object to send out the object in the selected conveying direction; a conveyance destination storage unit temporarily storing the conveyance destination information; an information receiving unit receiving the conveyance destination information from an upstream zone; and an information transmitting unit transmitting the conveyance destination information to a downstream zone, wherein the conveyor transfers the conveyance destination information from the upstream zone to the downstream zone with movement of the object across the zones.

Another aspect is a conveyor that conveys an object from a start position to a target place, the conveyor being divided into a plurality of zones each having a length that enables the zone to place at least one object thereon and conveying an object across the zones, wherein the zones include linear conveying zones that linearly convey an object and conveying direction changing zones that select a conveying direction of an object and send out the object in the selected conveying direction, the conveyor further includes at least one object identifying device and an initial information transmitting unit for transmitting conveyance destination information to any of the zones, each of the zones includes a conveyance destination storage unit for temporarily storing the conveyance destination information, an information receiving unit for receiving the conveyance destination information from the upstream zone, and an information transmitting unit for transmitting the conveyance destination information to the downstream zone, and the conveyor transfers the conveyance destination information from the upstream zone to the downstream zone with movement of an object across the zones.

The "linear conveying zone that linearly conveys an object" indicates a zone that includes one object introducing part and one object discharging part. The linear conveying zone may have the function of reversing the rotation of a motor so as to interchange the introducing part and the discharging part. In the "linear conveying zone that linearly conveys an object", it does not matter whether the plane shape of the conveying passage is a straight passage or a curved passage. The linear conveying zone does not have the function of selecting the discharging direction of an object between right and left directions and upper and lower directions.

On the other hand, the conveying direction changing zone indicates a zone that is capable of discharging an introduced object into a plurality of directions or a zone that is capable of receiving an object from a plurality of directions. The discharging direction and the carrying-in direction in the conveying direction changing zone may be a perpendicular direction or an oblique direction.

The conveying direction changing zone may change the conveying direction in the upper and lower directions. That is, when the conveyor is a three-dimensional conveyor and a conveying passage extends in the upper and lower directions, an introduced object may be titled to the upper stage conveying passage or may be lowered to the lower stage conveying passage.

The conveyor of this aspect includes the linear conveying zones which linearly convey an object and the conveying direction changing zones which select a conveying direction and send out an object in the selected conveying direction, and the conveying passage is divided into a plurality of branch conveying passages.

The conveyor of this aspect includes at least one object identifying device and thus can identify an object. The conveyor of the present invention further includes the initial information transmitting unit for transmitting the conveyance destination information to any of the zones. Thus, the initial information transmitting unit transmits information of a conveyance destination of the identified object to any of the zones. The initial information transmitting unit may transmit information to a plurality of zones.

In the conveyor of this aspect, each of the zones includes the conveyance destination storage unit, the information receiving unit, and the information transmitting unit, and the conveyance destination information is transferred from the upstream zone to the downstream zone with movement of an object across the zones. Thus, when an object has arrived at the conveying direction changing zone, the conveyance destination information has also been transmitted to the conveying direction changing zone. The conveying direction changing zone operates on the basis of the transmitted information about the conveyance destination so as to send out the object to a desired direction.

A plurality of zones may be controlled by one control device. In this case, the conveyance destination information is transferred from a memory in charge of the upstream zone to a memory in charge of the downstream zone within the control device.

A part of the conveyor may include a region that is not divided into zones. For example, a part of the conveyor may include a long straight conveying passage.

Information is desirably transferred between each adjacent zones. However, an intermediate zone may be skipped in the transfer of information.

That is, "with movement of an object across zones" is not limited to a case in which an object is moved across adjacent zones and includes a case in which an intermediate zone is present and an object is moved between zones beyond the intermediate zone.

An aspect for solving the same problems is a conveyor for conveying an object from a start position to a target place, the conveyor including: a plurality of zones into which the conveyer is divided, each of the zones including: a linear conveying zone linearly conveying the object; and a conveying direction changing zone selecting a conveying direction of the object to send out the object in the selected conveying direction; a region where the conveyor conveys the object across the zones; a zone controller for controlling one or more of the zones, including: a conveyance destination storage unit temporarily storing a conveyance destination information of the object itself; an information receiving unit receiving the conveyance destination information from an upstream zone; and an information transmitting unit transmitting the conveyance destination information to a downstream zone; at least one object identifying device; and an initial information transmitting unit transmitting the conveyance destination information of the object to any of the zones, wherein the conveyor transfers the conveyance destination information from the zone controller that controls the upstream zone to the zone controller that controls the downstream zone with movement of the object.

Information is desirably transferred between each adjacent zones. However, when there is no branching point in an intermediate part, the intermediate zone may be skipped to transfer information from the upstream zone to the downstream zone that is separated by some zones from the upstream zone.

When the zone controller controls a plurality of zones, information is desirably transferred between each adjacent zone controllers. However, when there is no branching point in an intermediate part, the intermediate zone controller may be skipped to transfer information from the upstream zone controller to the downstream zone controller that is separated by some zones from the upstream zone controller.

In each of the above aspects, desirably, the linear conveying zone individually has power to allow the linear conveying zone to be driven and stopped independently from the other zones, the linear conveying zone includes a load presence sensor that detects whether the object is present thereon, and the conveyance destination information stored in the conveyance destination storage unit is deleted and/or rewritten on the basis of whether the linear conveying zone has been driven and whether the load presence sensor has detected presence of the object.

In the conveyor of this aspect, the conveyance destination information stored in the conveyance destination storage unit is deleted and/or rewritten on the basis of whether the linear conveying zone has been driven and whether the load presence sensor has detected the presence of an object. Thus, fewer malfunctions occur.

In each of the above aspects, desirably, the linear conveying zone individually has power to allow the linear conveying zone to be driven and stopped independently from the other zones, the linear conveying zone includes a load presence sensor that detects whether the object is present thereon, and the conveyance destination information stored in the conveyance destination storage unit is rewritten when the linear conveying zone has been driven and the load presence sensor has changed from a state of not detecting the presence of the object to a state of detecting the presence of the object.

In each of the above aspects, desirably, a unique address is set to each of the zones.

In each of the above aspects, desirably, the unique address is automatically settable, In each of the above aspects, desirably, the conveyor further includes a display device that displays a layout of the conveyor.

In each of the above aspects, desirably, the conveyor is capable of taking in drawing information created by another device to create a layout to be displayed on the display device.

In each of the above aspects, desirably, each of the zones includes: a load presence sensor that detects whether the object is present thereon; and a zone controller to which a signal of the load presence sensor is input, the zone controller controlling one or more of the zones, the zone controller including the conveyance destination storage unit, the information receiving unit, and the information transmitting unit.

In each of the above aspects, desirably, the conveyor has any of the following functions:

(1) a number collecting function of conveying the objects to the downstream side when a specified number of the objects have been collected in some of the zones;

(2) a ratio branching function of distributing the objects to a plurality of the conveyance destinations to which the objects can be conveyed; and (3) a congestion avoiding function of making the object take a detour when there is a congestion in the conveyance destination.

In each of the above aspects, desirably, the conveyor further includes a conveyance destination selecting unit identifying the conveyance destination of the object with the object identifying device, and the initial information transmitting unit transmits information about the identified conveyance destination to any of the zones.

In each of the above aspects, desirably, the conveyance destination selecting unit includes a route determining unit for determining a conveying route, and the initial information transmitting unit transmits information about the conveying route to any of the zones.

In each of the above aspects, desirably, when there are a plurality of conveying routes, the conveyance destination selecting unit is capable of performing a search for the shortest conveying route among the conveying routes.

In each of the above aspects, desirably, when there are a plurality of conveying routes, the conveyance destination selecting unit is capable of performing a search for one of the conveying routes that enables the object to arrive at the conveyance destination within the shortest time among the conveying routes.

In each of the above aspects, desirably, information about the conveyance destination includes the following information:

(1) information about the zone where the conveying direction is changed, and the conveying direction in the zone.

Desirably, each of the zones has a length that enables the zone to place at least one object thereon.

Desirably, some or all of the linear conveying zones are capable of conveying the object in both forward and reverse directions.

Desirably, the conveyor further includes a total length measuring device that measures total length of the object.

An aspect relating to a conveyor system provides a conveyor system including the above conveyor and another equipment, or including a plurality of the above conveyors, wherein the conveyor system includes individual control devices that individually control the conveyor and the equipment included in the conveyor system and an integrated controller that integrally controls the individual control devices included in the conveyor system.

In the above aspect, desirably, the integrated controller also serves as the individual control device that individually controls the conveyor.

Another aspect for solving the above problems is a zone controller used in a conveyor, the conveyor including: a plurality of zones into which the conveyor divided, an object being conveyed across the zones; a motor in each of the zones; and a load presence sensor detecting whether the object is present on the zone, the zone controller for controlling one or more of the zones and for supplying power to the motor, including: a conveyance destination storage unit temporarily storing conveyance destination information of the object; an information receiving unit receiving the conveyance destination information from an upstream zone; and an information transmitting unit transmitting the conveyance destination information to a downstream zone, the zone controller being capable of inputting a signal of the load presence sensor, wherein the zone controller rewrites the conveyance destination information stored in the conveyance destination storage unit when the motor of the zone controlled by the zone controller has been driven and the load presence sensor has changed from a state of not detecting the presence of the object to a state of detecting the presence of the object.

Another aspect for solving the above problems is a conveying module including: a mechanical structure placing an object thereon to convey the object; and a controller controlling the mechanical structure, the mechanical structure and the controller being integrated with each other, wherein the mechanical structure includes a direction changing mechanism that switches a conveying direction or a carrying-in direction to allow the mechanical structure to carry in the object from one or more of the carrying-in directions and to carry out the object to one or more of the conveying directions, and wherein the controller includes a control unit for introducing the object, a control unit for operating the direction changing mechanism, and a control unit for discharging the object.

In the above aspect, desirably, the controller further includes an information receiving unit receiving conveyance destination information of the object itself from the controller in another of the conveying module and operates the direction changing mechanism on the basis of each information received by the information receiving unit.

Another aspect for solving the above problems is a CAD device that designs the above conveyor, the CAD device including: a layout creating unit for creating a layout of the conveyor that comprises the zones; a layout displaying unit for displaying the layout; an information inputting unit for writing at least following information; and an information outputting unit for outputting the information:

(1) information about a position of the zone
(2) information about an operation of the zone.

In the above aspect, desirably, the information includes information that identifying an adjacent zone.

Another aspect for solving the above problems is a method for manufacturing the conveyor a having the above configuration, including: manufacturing a conveying module that comprises: a control device having a writable memory; and a mechanical structure of each of the zones, the control device and the mechanical structure being integrated with each other; writing information written into the above CAD device into the memory of the conveying module; transporting the conveying module having information written in the control device to a construction site; and coupling the zones according to the layout designed by the CAD device.

Effect of Invention

The conveyor and the conveyor system of the present invention have a small number of components and can be easily constructed. When the zone controller or the conveying module of the present invention is used, it is possible to largely reduce the number of information read-out devices and easily construct the conveyor.

According to the CAD device and the method for manufacturing the conveyor of the present invention, an operation of designing and constructing the conveyor can be simplified.

BRIEF DESCRIPTION OF DRAWINGS

FIGS. 9A and 9B are perspective views illustrating another example of the conveying direction changing device, wherein FIG. 9A illustrates a state in which an object is conveyed straight forward, and FIG. 9B illustrates a state in which an object is branched in an oblique direction.

BEST MODE FOR CARRYING our THE INVENTION

Hereinbelow, an embodiment of the present invention will further be described.

Figure 1:
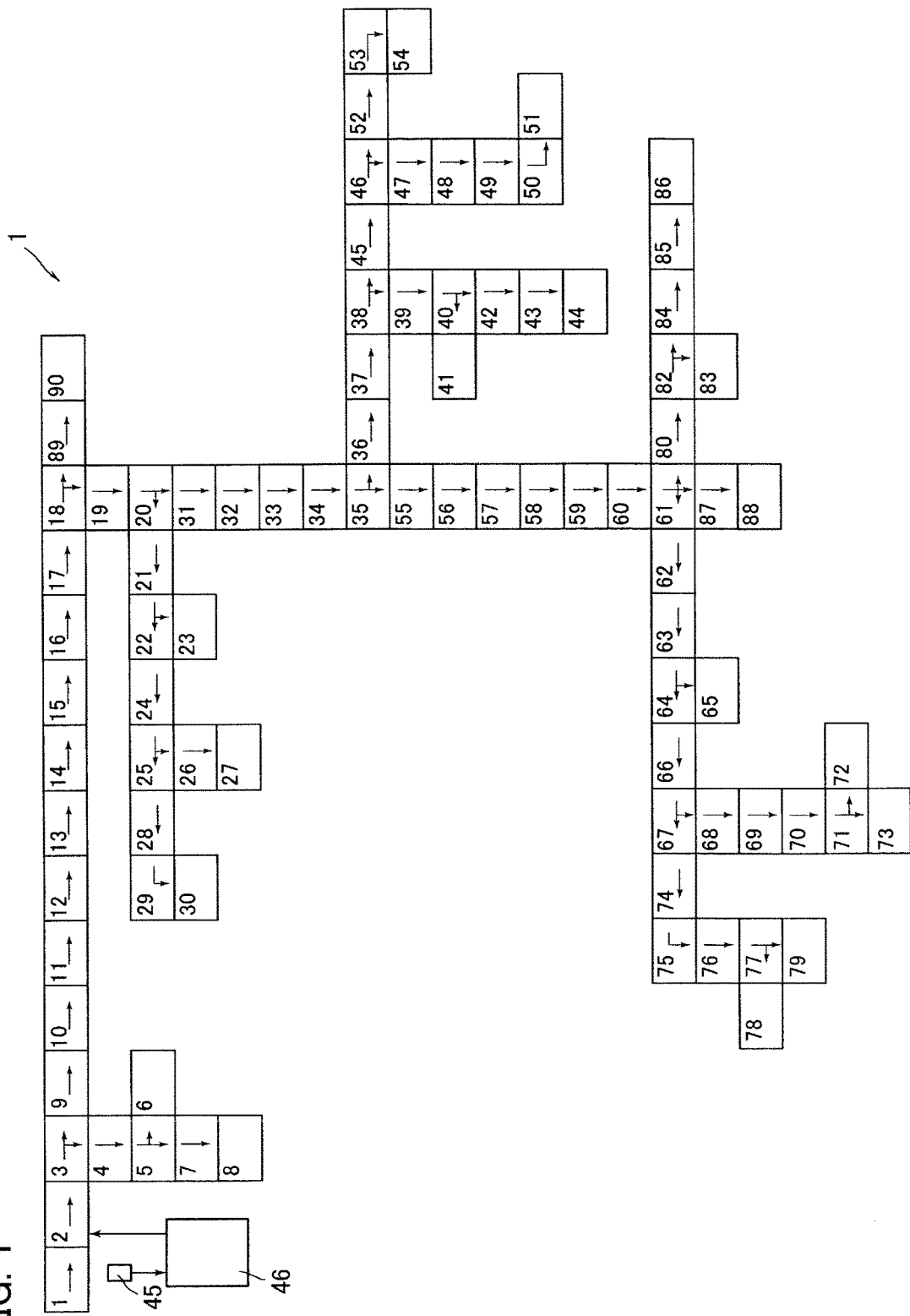
FIG. 1 is the layout of a conveyor and a display screen of a display device according to a first embodiment of the present invention.

A conveyor 1 of a first embodiment has a layout as illustrated in FIG. 1. In the conveyor 1, a conveying passage is divided into a plurality of branch conveying passages, and there are a plurality of target places to which objects are conveyed.

In the conveyor 1 of the first embodiment, a straight part of the conveying passage is divided into a plurality of short zones. That is, in the conveyor 1, a plurality of linear conveying zones are connected in series to constitute the straight part of the conveying passage. Further, the conveyor 1 includes a plurality of conveying direction changing zones so as to constitute branch conveying passages.

The conveyor 1 is used for conveying objects having substantially the same size such as pallets, containers, or trays. Each of the zones has a length that enables the zone to place at least one object thereon.

One conveying module is disposed in each of the zones. The conveying module includes a mechanical structure part and a zone controller 10 which are integrated with each other.

Figure 3:
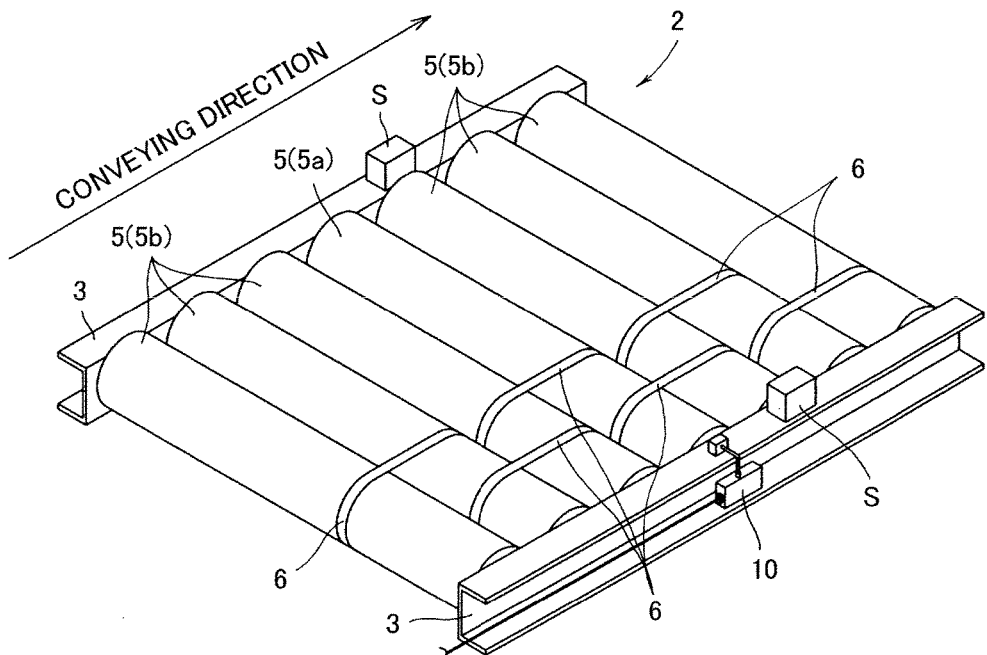
FIG. 3 is a perspective view of a zone conveyor which constitutes a linear conveying zone.
Figure 5:
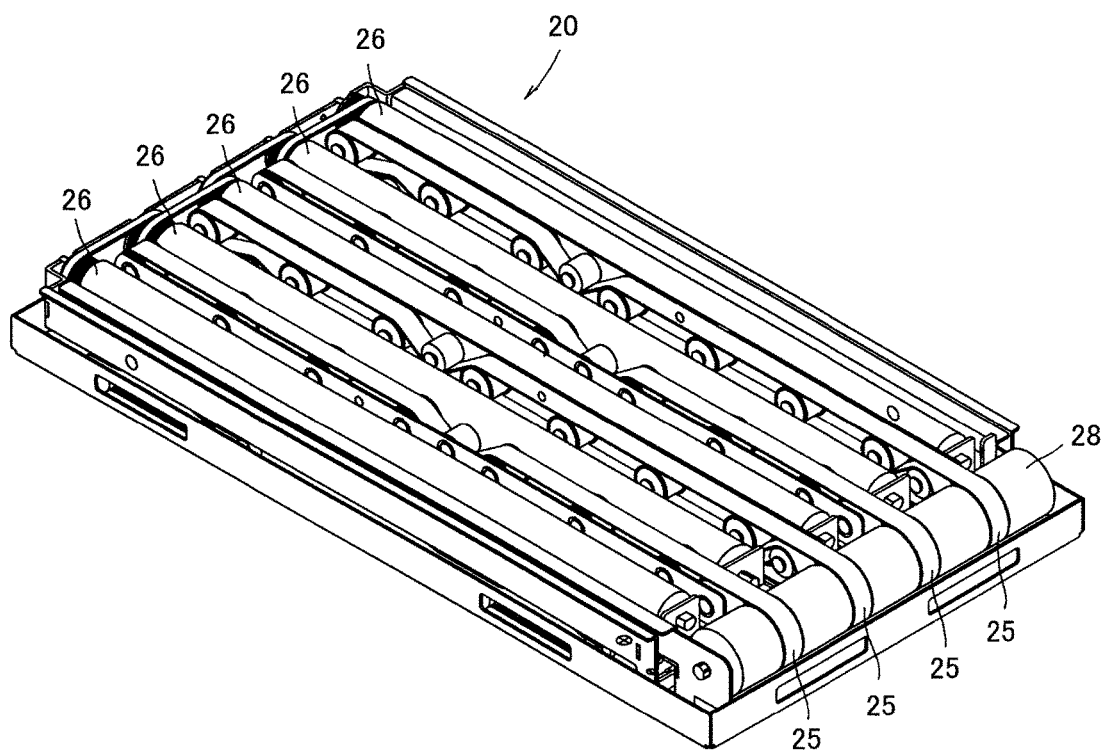
FIG. 5 is a perspective view illustrating an example of a conveying direction changing device.

A conveying module installed in the linear conveying zone is a zone conveyor 2 as illustrated in FIG. 3. A conveying module installed in the conveying direction changing zone is a transfer device 20 as illustrated in FIG. 5.

The zone conveyor 2 is a roller conveyor, and includes a pair of right and left side frames 3, 3 which are arranged parallel to each other and a plurality of conveying rollers 5 which convey an object W. The conveying rollers 5 are rotatably supported at predetermined intervals in a conveying direction between the side frames 3, 3. The conveying rollers 5 include a follower roller 5b which freely rotates and a motor-incorporating roller 5a which incorporates a driving motor (not illustrated) therein. In the present embodiment, only one motor-incorporating roller 5a is provided, and the other conveying rollers 5 are all follower rollers 5b.

A transmission belt 6 is wound around conveying rollers 5 that are adjacent in the zone conveyor 2, Thus, a rotation driving three of the motor-incorporating roller 5a can be transmitted to all the follower rollers 5b. In the present embodiment, the motor-incorporating roller 5a is disposed on the center.

The zone conveyor 2 can make a change between a carrying-in direction and a conveying direction by rotating the motor-incorporating roller 5a in a forward direction and a reverse direction. However, the zone conveyor 2 does not have the function of branching a conveyance destination and the function of introducing an object from a plurality of carrying-in passages.

As illustrated in FIG. 3, the zone conveyor 2 is provided with a load presence sensor S. The load presence sensor S is disposed on the side frame 3. The position of the load presence sensor S is near the downstream end.

A photoelectric sensor can be used as the load presence sensor S. A light emitting element (not illustrated) such as a light emitting diode or an infrared diode is disposed on the opposed side frame 3. Accordingly, when an object is conveyed, light from the light emitting element is blocked, and an ON (H level) signal is output. On the other hand, when there is no conveyed object, an OFF (L level) signal is output. The photoelectric sensor is turned ON/OFF in this manner, which makes it possible to detect that an object has been conveyed to a predetermined position.

Figure 4:
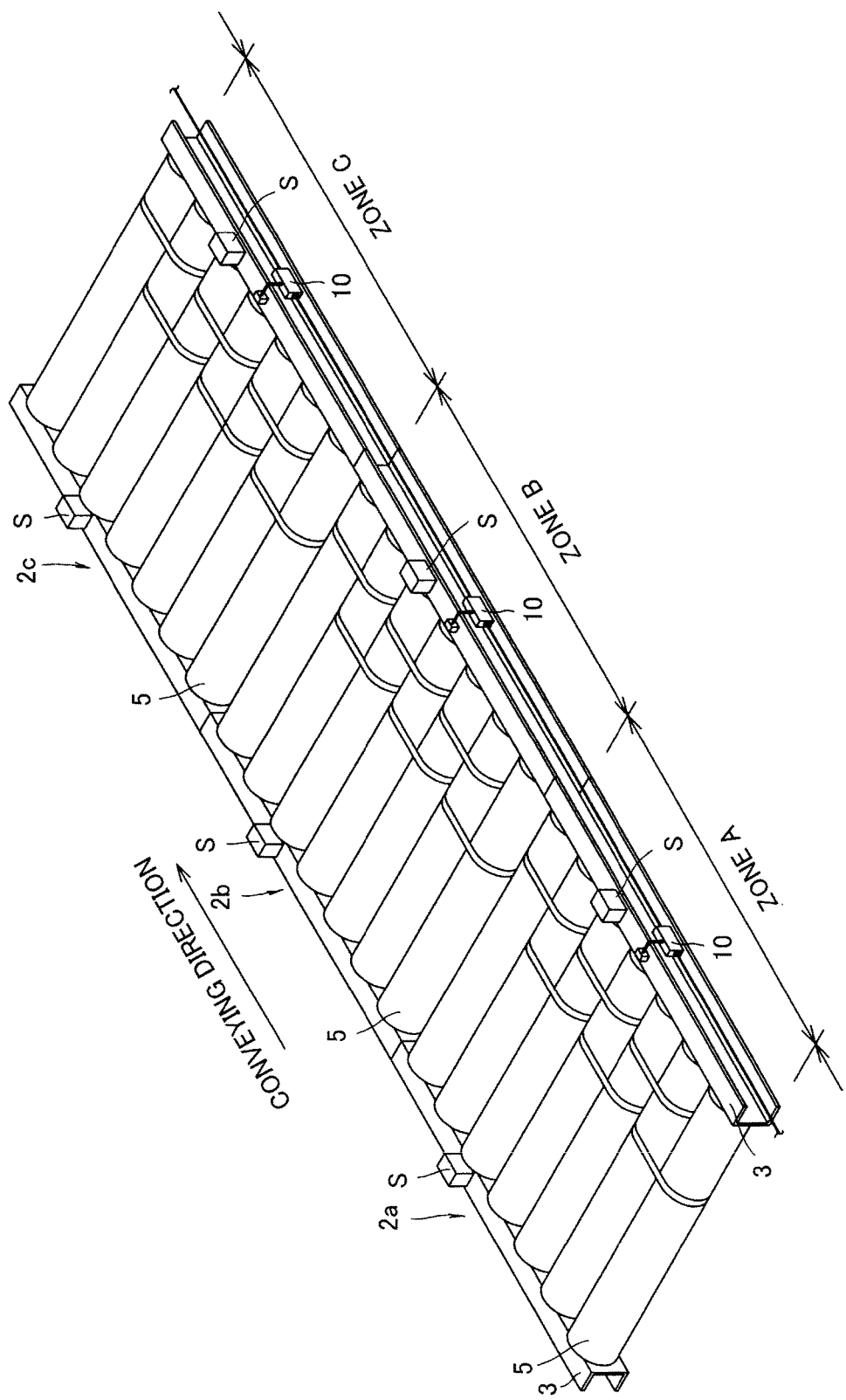
FIG. 4 is a perspective view of a straight conveying passage in which three zone conveyors are connected.

The straight part of the conveying passage of the conveyor 1 includes the zone conveyors 2 as conveying modules which are connected in series as illustrated in FIG. 4. As illustrated in FIG. 4, a zone controller 10 for performing driving control for the motor inside the motor-incorporating roller 5a is disposed on one of the side frames 3 of each of the zone conveyors 2a, 2b, 2c. The zone controller 10 is integrally attached to the zone conveyor 2 as a mechanical structure part and constitutes a part of the conveying module.

The function of the zone controller 10 will be described below.

Figure 6:
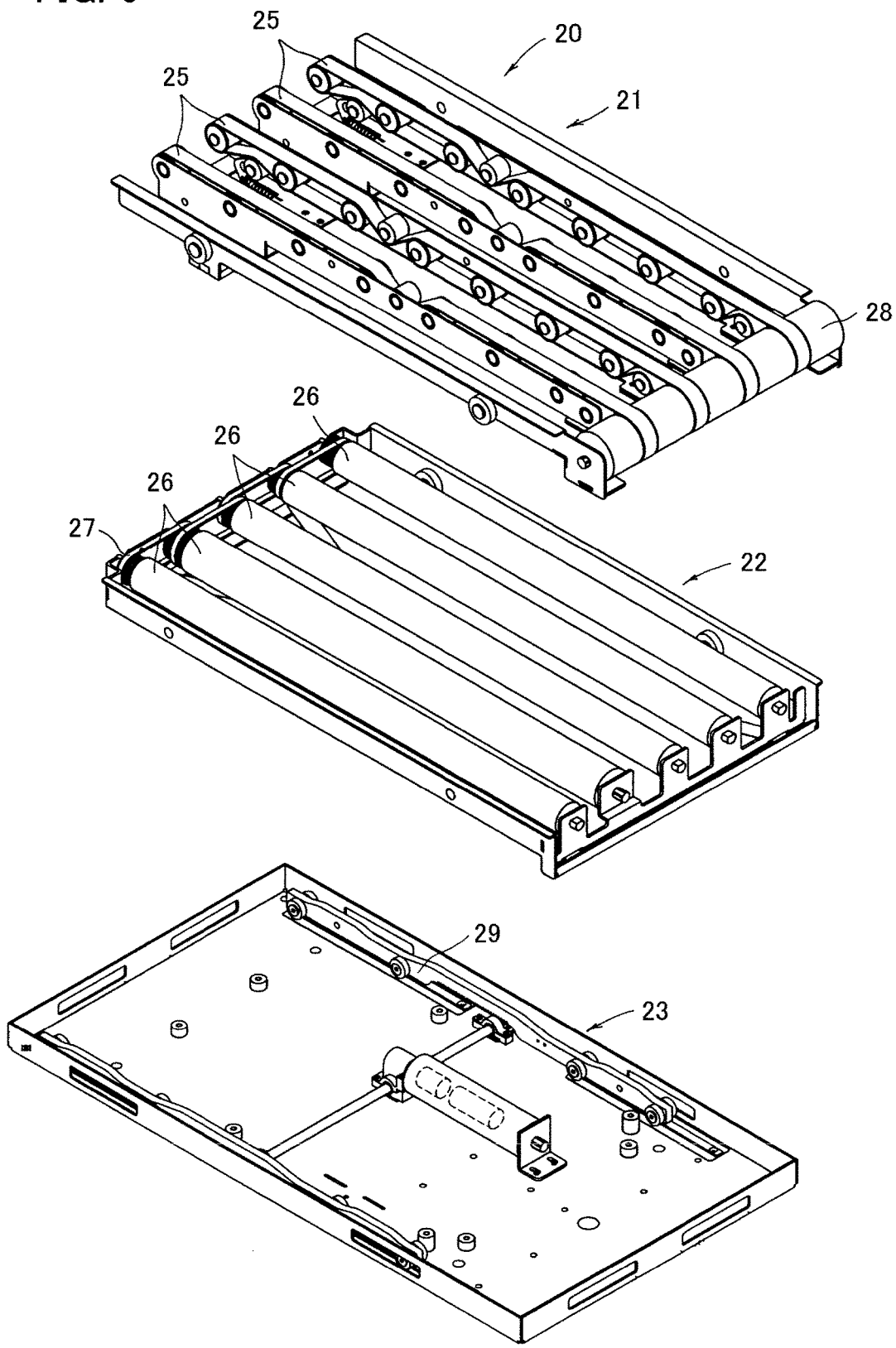
FIG. 6 is an exploded perspective view of the direction changing device of FIG. 5.
Figure 7:
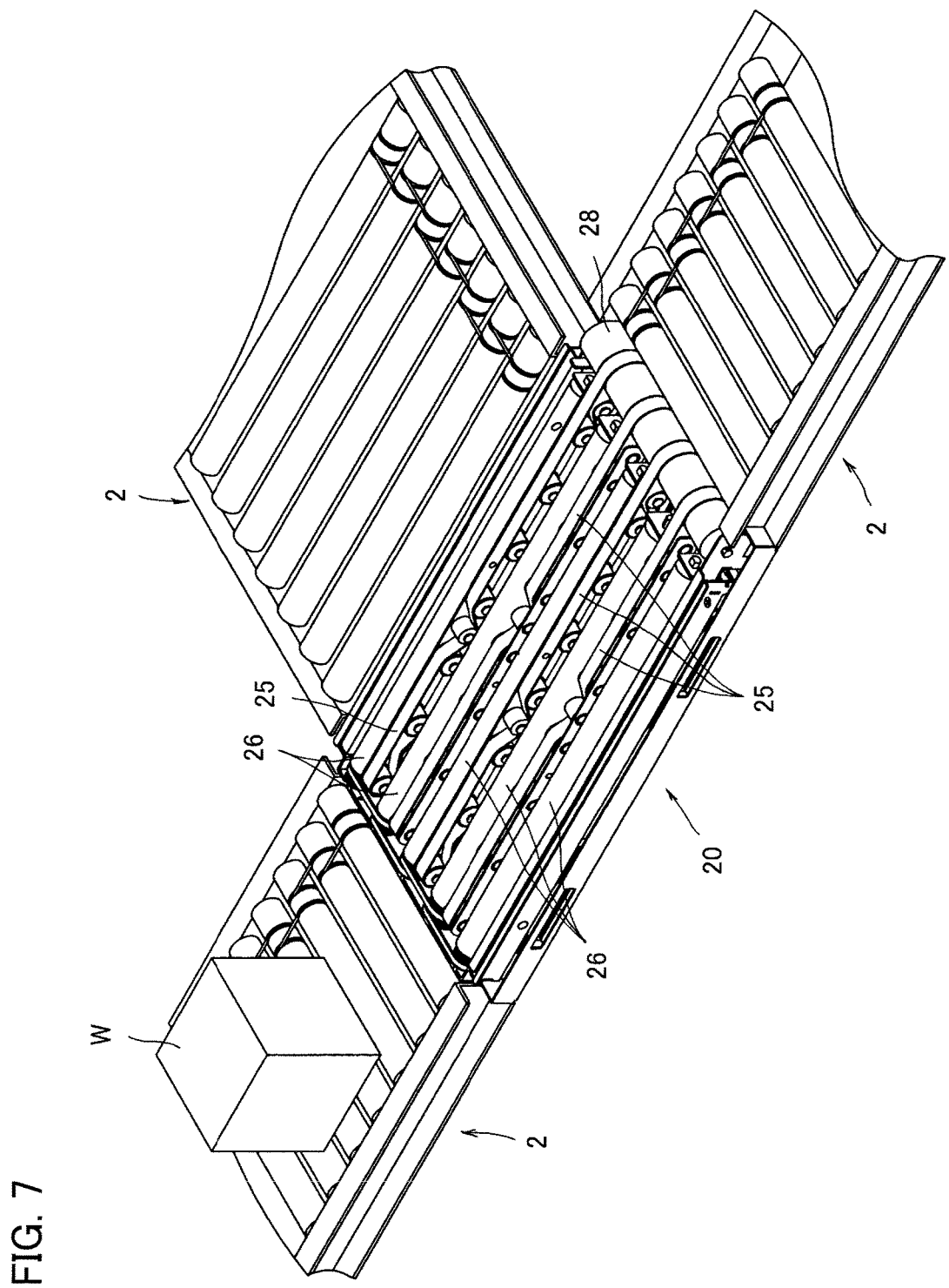
FIG. 7 is a perspective view around a conveying direction changing zone which includes the conveying direction changing device of FIG. 5.

Next, the conveying direction changing zone will be described. A conveying module installed in the conveying direction changing zone is the transfer device 20 as illustrated in FIGS. 5, 6, and 7. The transfer device 20 includes a direction changing mechanism which switches the conveying direction or the carrying-in direction.

As illustrated in FIG. 6, the transfer device 20 includes a main conveyor 21, a sub conveyor 22, and a lifting and lowering device 23.

The main conveyor 21 of the transfer device 20 is a belt conveyor which includes a plurality of thin belts 25 arranged at certain intervals. The main conveyor 21 is driven by a motor-incorporating roller 28 which is disposed at the end thereof.

The sub conveyor 22 of the transfer device 20 is a roller conveyor. The sub conveyor 22 includes a plurality of rollers 26 which are arranged parallel to each other and operate together through a belt 27. One of the rollers 26 of the sub conveyor 22 serves as a motor-incorporating roller, and all the rollers 26 are rotated by driving the motor-incorporating roller.

As illustrated in FIG. 5, the sub conveyor 22 is arranged in such a manner that the rollers 26 are interposed between the belts 25 of the main conveyor 21.

The lifting and lowering device 23 includes a translation cam 29, and lifts and lowers the main conveyor 21 and the sub conveyor 22.

When an object placed on the transfer device 20 is moved straight forward, the lifting and lowering device 23 lifts the main conveyor 21 so as to project above the sub conveyor 22, and the motor-incorporating roller 28 of the main conveyor 21 is driven to cause the belts 25 to run.

When an object placed on the transfer device 20 is discharged in the lateral direction, the object is led into the main conveyor 21, the lifting and lowering device 23 then lifts the sub conveyor 22 and lowers the main conveyor 21 so that the sub conveyor 22 projects above the main conveyor 21, and the motor-incorporating roller of the sub conveyor 22 is driven to rotate each of the rollers 26.

A load presence sensor (not illustrated) is provided also in the transfer device 20. Further, a zone controller (not illustrated) is attached also to the transfer device 20.

The zone controller 10 is integrally attached to the transfer device 20 as a mechanical structure part and constitutes a part of the conveying module.

The layout of the conveyor 1 of the first embodiment is as illustrated in FIG. 1 and includes a conveying passage branched in a complicated manner. The conveyor 1 of the first embodiment includes no bypass route, which differs from second and third embodiments (described below).

A unique address is set to each of the zones. For convenience, as illustrated in FIG. 1, the addresses of 1 to 88 are assigned. In the present embodiment, the address of the first zone is 1, and the address of the second zone is 2. Thereafter, addresses are sequentially assigned.

The address of each of the zones is stored in the zone controller 10 of the zone.

Figure 2:
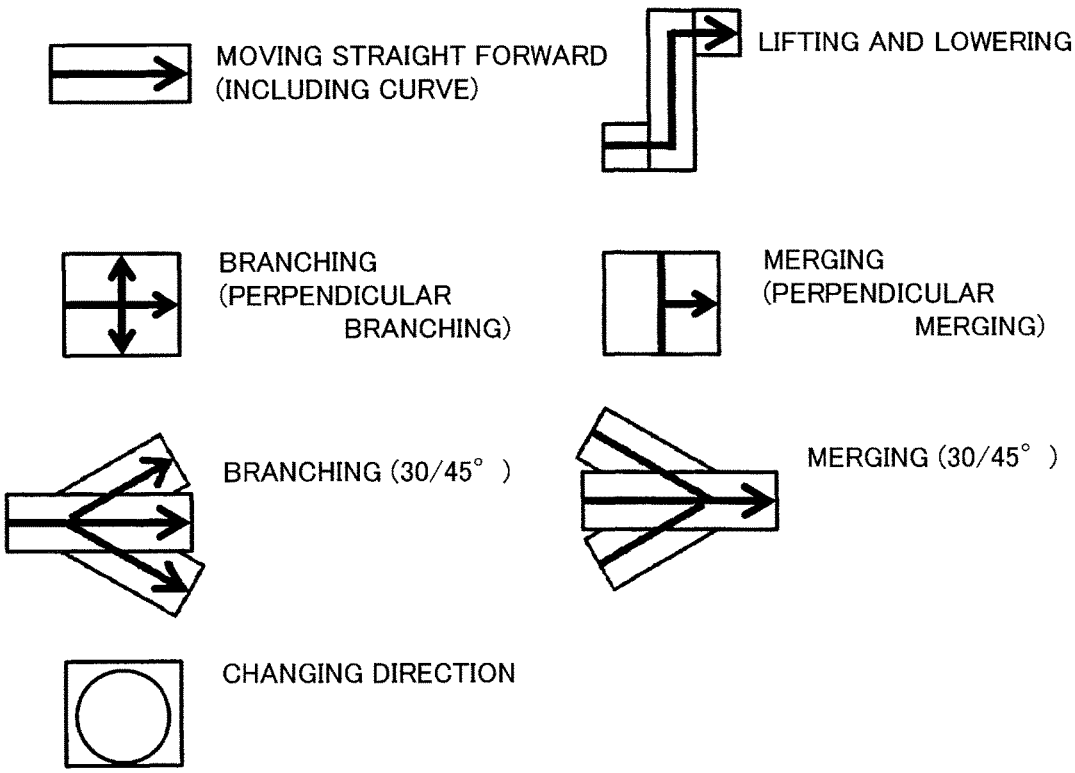
FIG. 2 is an explanatory diagram describing a mark that indicates the function of a conveying module installed in each zone of the conveyor.

An arrow marked in each of the zones indicates a modeled function of the conveying module of the zone. The meanings of the arrows are as illustrated in FIG. 2, in the conveyor 1 of the first embodiment, only "MOVING STRAIGHT FORWARD" and "BRANCHING" of FIG. 2 are used. That is, a straight arrow indicates the zone conveyor 2 as a conveying module of the linear conveying zone.

A branched arrow indicates the transfer device 20 as a conveying module of the conveying direction changing zone.

In the conveyor 1 of the first embodiment, zones with addresses 3, 5, 18, 20, 22, 25, 29, 35, 38, 40, 46, 50, 53, 61, 64, 67, 71, 75, 77, 82 are conveying direction changing zones. The conveying modules of the conveying direction changing zones are the transfer devices 20. The other zones are linear conveying zones, and the conveying modules thereof are the zone conveyors 2.

Figure 8:
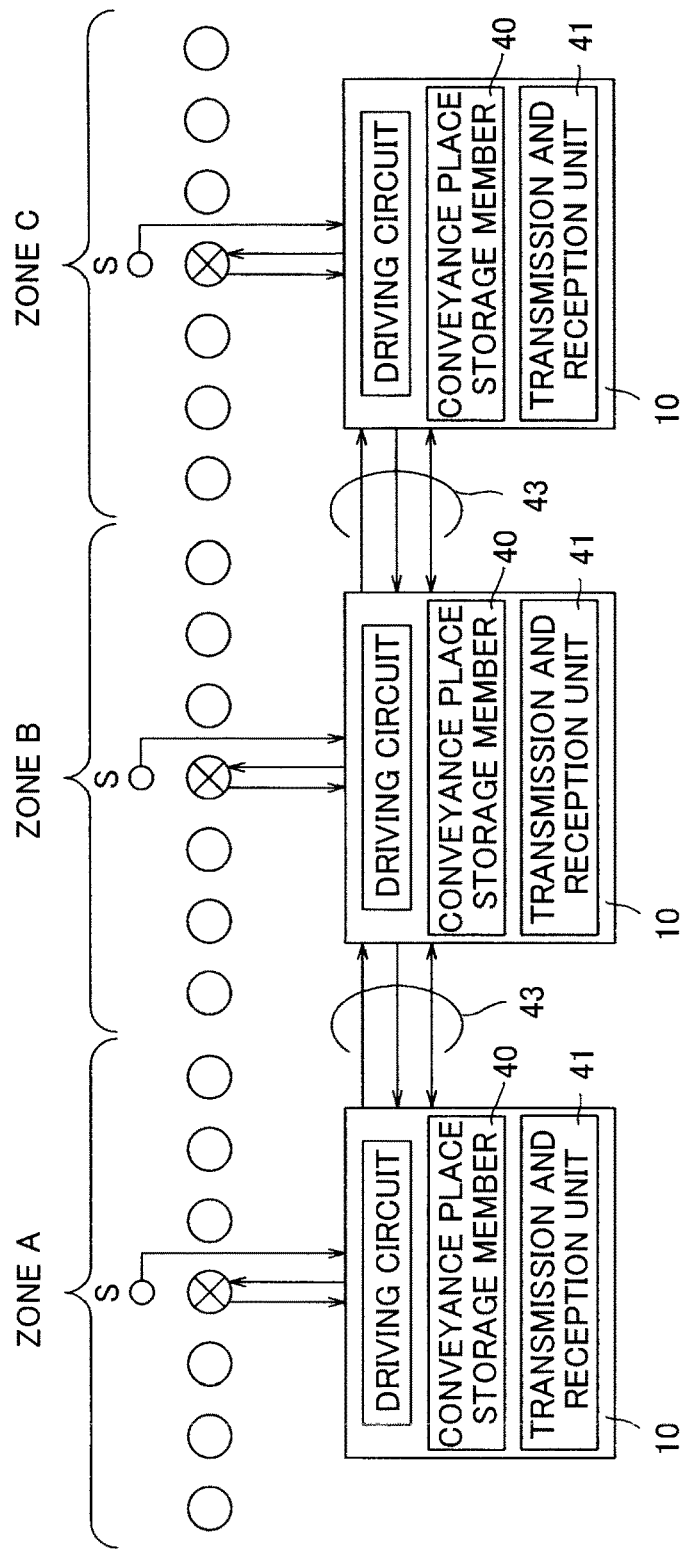
FIG. 8 is a block diagram of a zone controller and a circuit diagram illustrating the relationship between adjacent zone controllers.

As described above, the zone controller 10 and the load presence sensor S are provided in each of the zones. The zone controller 10 of each of the zones supplies power to the motor of the conveying module of the zone, and drives and stops the motor of the conveying module of the zone. That is, as illustrated in FIG. 8, a driving circuit which drives the motor is incorporated in the zone controller 10. Specifically, the driving circuit which drives the motor incorporated in the motor-incorporating roller is incorporated in the zone controller 10.

Further, a conveyance destination storage member (conveyance destination storage unit) 40 and a transmission and reception unit 41 are incorporated in the zone controller 10.

The conveyance destination storage member 40 is a memory and functions as a conveyance destination storage unit for temporarily storing the conveyance destination information. Here, "the conveyance destination information" indicates a conveyance destination on the conveyor 1 and includes the address. The transmission and reception unit 41 transmits and receives a signal to and from the zone controllers 10 of the adjacent zones. The transmission and reception unit 41 has a function as an information receiving unit for receiving the conveyance destination information from the upstream zone and a function as an information transmitting unit for transmitting the conveyance destination information to the downstream zone.

The zone controllers 10 are provided in all the zones. The adjacent zone controllers 10 are connected to each other through a signal line 43. A signal of the load presence sensor S of each of the zones is input to the corresponding zone controller 10.

In the conveyor 1 of the first embodiment, an object identifying device 45 is installed in the first zone as a start position. Specifically, the object identifying device 45 is a bar code reader. Information read by the bar code reader is transmitted to a host control device (a conveyor controller or an integrated controller (ICS)). In the present embodiment, an integrated controller (ICS) is employed as the host control device 46.

The host control device 46 identifies an object from information described in a bar code and makes an inquiry about a conveyance destination (target place) of the object itself. Then, the host control device 46 transmits the address of the target place to the zone controller 10 of the second zone (initial information transmitting unit) and inputs the address to the conveyance destination storage member 40 of the zone controller 10 in the second zone.

The conveyance destination information input to the conveyance destination storage member 40 is passed on to the downstream zone controller 10 with the conveyance of the object.

Although not employed in the conveyor 1 of the first embodiment, the host control device 46 may transmit the address of the target place also to the conveyance destination storage member 40 of another zone. That is, the address of the target place may be transmitted to the zone controllers 10 of a plurality of zones. Specifically, the address of the target place may be transmitted to the conveyance destination storage member 40 of the upstream zone and also to the conveyance destination storage member 40 of the downstream zone.

For easy description, information input to the conveyance destination storage member 40 of the zone controller 10 in the second zone is referred to as the first initial information, and information input to the downstream zone is referred to as the second initial information.

The host control device 46 described above is a known personal computer and incorporates a CPU and a memory therein (not illustrated).

The host control device 46 functions as an object selecting unit, a conveying route determining unit, a special conveyance instructing unit, and an initial information transmitting unit.

In the present embodiment, the conveyance destination information is input to the host control device 46 from a control device of a further higher order and is stored in the internal memory. For example, conveyance destination information indicating that an object A is an object to "FUJITA SHOP", and a product B is an object to "OHMI-NAMI STORE" is input. The conveyance destination information is stored in the internal memory.

A signal of the object identifying device 45 is input to the host control device 46. That is, information identifying an object read by the bar code reader is input.

In the present embodiment, the host control device 46 functions as a conveyance destination selecting unit and checks object identifying information input from the object identifying device 45 against the conveyance destination information stored in the memory to determine a conveyance destination of the object on the conveyor 1.

The host control device 46 has the function of determining a conveying route of an object on the conveyor 1.

That is, the CPU (not illustrated) performs a search for a route from the first zone as the start position to a final conveyance destination.

For example, when there are a plurality of conveying routes as in a conveyor 60 of the second embodiment and a conveyor 8 of the third embodiment (described below), the CPU performs a search for the shortest route in principle. The conveyor 1 of the first embodiment includes only a single conveying route. Thus, this function is not used.

When there are a plurality of conveying routes as in the conveyor 60 of the second embodiment and the conveyor 8 of the third embodiment, it is possible to perform a search for a conveying route that enables an object to arrive at the conveyance destination within the shortest time. For example, when there are a plurality of routes from the first zone as the start position to the final conveyance destination, but the shortest route has many objects to pass therethrough, a search for a bypass route is performed Then, an optimum conveying route is determined and transmitted to the zone controller 10 of the second zone. That is, in the present embodiment, the host control device 46 functions as the initial information transmitting unit.

Initial information transmitted to the zone controller 10 of the second zone is the first initial information and a conveyance destination to which an object should be conveyed. The first initial information is the final conveyance destination of an object in principle. However, the first initial information may be an intermediate transit position depending on objects.

For example, when a "number collecting operation" (described below) is performed, a zone on the way of the final conveyance destination is designated as the first initial information.

The host control device 46 has the function of transmitting the second initial information to the zone controller 10 of the downstream zone as described above. The second initial information includes information that indicates a direction in which a specific object arrived at the zone should further move.

That is, a specific object arrives at a specific zone on the basis of the first initial information. Further, the host control device 46 inputs the second initial information to the zone controller 10 of the zone where the object has arrived on the basis of the first initial information, and the object then moves to a destination of the second initial information.

In the present embodiment, each zone controller 10 and the host control device 46 are coupled to each other through a communication means. Each zone controller 10 inputs information of the load presence sensor S and information of an object on the corresponding zone to the host control device 46 through the communication means.

On the other hand, the host control device 46 can transmit a signal for stopping an individual zone to each zone controller 10 through the communication means.

In the present embodiment, special conveyances such as the "number collecting operation", a "ratio branching operation", a "congestion avoiding operation", and a "merging operation" can be performed on the basis of information transmitted from each zone controller 10 to the host control device 46 (information of the load presence sensor S and information of an object on the corresponding zone) and a signal for stopping an individual zone transmitted from the host control device 46 to each zone controller 10.

Here, the "number collecting operation" indicates an operation in which a specified number of objects are collected in a plurality of zones and then sent out to the downstream side.

Specifically, in a normal operation, an object is first carried into a zone, and the object is then sent out to the downstream zone when there is no object on the downstream zone.

On the other hand, in the "number collecting operation", when a specific object has arrived at a specific zone, the start zone is stopped until some number of objects of the same kind are collected in a zone that are adjacent to the specific zone at the upstream side. Then, when a desired number of objects have been collected in the upstream adjacent zone, these objects are collectively conveyed to the downstream side at once.

In the "number collecting operation", a zone in which an object is held on standby is indicated as the first initial information, and a specific object is conveyed to the standby zone.

When a predetermined number of objects have been collected in the standby zone and a zone adjacent to the standby zone at the upstream side and information transmitted from the zone controller 10 to the host control device 46 indicates the fact thereof, a cancellation signal for cancelling the stop of the zone is transmitted from the host control device 46, and a zone to which the objects are finally conveyed is indicated as the second initial information to the zone controller 10. Then, the objects are moved to the target zone.

Further, a similar operation can be achieved by indicating a zone to which objects are finally conveyed as the first initial information, transmitting a stop signal from the host control device 46 to the standby zone to temporarily stop an object, and transmitting a cancellation signal for cancelling the stop of the zone from the host control device 46 when a predetermined number of objects have been collected.

The "ratio branching operation" indicates an operation in which there are plurality of conveyance destinations to which objects may be conveyed, and objects are distributed to the conveyance destinations.

For example, there may be two trucks or containers used for transporting objects to the same destination (e.g., FUJITA STORE), and the objects may be carried into either one of the trucks.

In this case, the objects should be carried into a plurality of trucks in proper quantities. An operation of distributing objects to a plurality of trucks in proper quantities is the "ratio branching operation".

Specifically, when a specific object has arrived at a specific zone, for example, a final conveyance destination of the object is alternately changed.

In the "ratio branching operation", a zone as a branching point is indicated as the first initial information, and the specific object is conveyed to the branching point zone.

When the specific object has arrived at the branching point zone, the second conveyance information is transmitted to the zone controller to alternately move objects to a plurality of zones. That is, a plurality of zones are alternately designated as the second conveyance information to alternately move objects to the plurality of zones.

In the present embodiment, in addition to an "alternate system" which alternately changes the final conveyance destination of objects as described above, a "priority system" may be selected. In the "priority system", the order of priority is determined. When a predetermined number of objects have been collected in a conveyance destination having a higher priority, an object is sent to a conveyance destination having a lower priority.

Alternatively, a "proportional system" may be selected. In the "proportional system", a distribution ratio is set, and objects are distributed to conveyance destinations according to the distribution ratio.

Although, in the "ratio branching operation", the final conveyance destination is input as the second conveyance information to the zone controller 10 at the stage when an object has arrived at the branching point, the final conveyance destinations of the respective objects may be determined from the beginning.

That is, a similar operation can be also achieved even if the final conveyance destinations of the respective objects are determined at the stage with the first initial information transmission.

The "congestion avoiding operation" indicates an operation that makes an object take a detour when there is a congestion in the conveyance destination.

In this operation, when objects have been collected in a zone of a specific area and information transmitted from the zone controller 10 to the host control device 46 indicates the fact, the host control device 46 transmits a signal for temporarily changing the conveying direction to a zone connected to a bypass passage to send an object to the bypass passage.

When an object stays in the same zone for a certain time, the host control device 46 may transmit a signal for temporarily changing the conveying direction to a zone connected to a detour to send the object to the bypass passage.

There may be employed a configuration that sends an object to a bypass passage when the above two conditions are satisfied.

The "merging operation" indicates an operation that controls a junction of the conveying passages. In the present embodiment, two systems of "alternate merging" and "lot merging" can be selected.

The "alternate merging" is a system in which, as an operation in a part where two upstream conveying passages merge with each other into a single downstream conveying passage, objects are conveyed to the downstream side alternately from one of the upstream conveying passage and the other upstream conveying passage.

The number of objects conveyed at a single time is not limited to one, and a plurality of objects may be conveyed at a single time. The number of introduced objects at a single time may differ from each other between one upstream conveying passage and the other upstream conveying passage in such a manner that two objects may be introduced from one upstream conveying passage and one object may be introduced from the other upstream conveying passage at a single time.

The "lot merging" is a system similar to the "number collecting operation". In the "lot merging", a certain number of objects are collected in one of the upstream conveying passages, and the objects are conveyed to the downstream side when the certain number of objects have been collected.

In the present embodiment, a display device 33 is connected to the host control device 46 to display which zone currently has each object on the monitor.

Hereinbelow, the function of the conveyor 1 of the first embodiment will be specifically descried.

The entire conveyor 1 of the first embodiment is divided into a plurality of small zones as described above, and the conveying module of each of the zones individually includes a conveying motor. Thus, the conveyor 1 of the first embodiment is capable of individually driving and stopping the zones. In the conveyor 1 of the present embodiment, the motor (conveying motor) of the conveying module in each of the zones is normally in a stopped state and is driven only when required.

The required case includes a state in which an object should be received from the upstream zone and state in which an object should be discharged to the downstream zone.

The former state corresponds to a case when an object is present on the upstream zone (preceding zone) and no object is present on the own zone. Specifically, when the load presence sensor of the upstream zone is detecting the presence of an object, the load presence sensor of the own zone is detecting no object, and the conveyance in the conveying module of the own zone is currently in a stopped state, the own conveying module is activated to receive the object.

Also when an object is present on the upstream zone, and the downstream zone is driving, an object can be received from the upstream zone. Specifically, also when the load presence sensor of the upstream zone is detecting the presence of an object, and the downstream zone is driving, the own conveying module is activated to receive the object.

The state in which an object should be discharged to the downstream zone corresponds to a case when an object is present on the own zone and no object is present on the downstream zone. Specifically, when the load presence sensor of the own zone is detecting the presence of an object, and the load presence sensor of the downstream zone is detecting no object, the own conveying module is activated to discharge the object to the downstream side.

Also when an object is present on the own zone, and the downstream zone is driving, the object can be discharged to the downstream zone. Specifically, also when the load presence sensor of the own zone is detecting the presence of an object, and the downstream zone is driving, the own conveying module is activated to discharge the object to the downstream zone.

In the conveyor 1 of the present embodiment, when an object is carried into the own zone from the upstream zone, the conveyance destination information is transmitted from the upstream zone to the own transmission and reception unit 41. Then, the conveyance destination information is stored in the conveyance destination storage member 40.

When the object is discharged from the own zone, the conveyance destination information stored in the own conveyance destination storage member 40 is deleted.

When the movement of an object is associated with the movement of information, an object is carried into the own zone from the upstream zone so that the object moves across the zones, the conveyance destination information is also transferred from the upstream zone to the downstream zone with the movement of the object.

Specifically, when the conveying module of the own zone is operated, and the own load presence sensor S in a state of detecting no object comes to detect an object, the conveyance destination information is transmitted from the upstream zone to the own transmission and reception unit 41 so as to rewrite the information in the conveyance destination storage member 40 and is stored in the own conveyance destination storage member 40.

When the own load presence sensor S in a state of detecting an object has changed to a state of detecting no object due to the operation of the conveying module of the own zone, and a certain time has elapsed thereafter, the conveyance destination information stored in the own conveyance destination storage member 40 is deleted.

That is, the conveyance destination information stored in the conveyance destination storage member 40 is deleted or rewritten on the basis of whether the conveying module of the linear conveying zone has been driven and whether the load presence sensor S has detected the presence of an object.

More specifically, when the conveying module of the own linear conveying zone has been driven and the load presence sensor S in a state of not detecting the presence of an object changes to a state of detecting the presence of an object, the conveyance destination information stored in the conveyance destination storage member 40 is rewritten.

In the conveyor 1, a bar code is attached to an object, and the object is placed on the first zone as the start position. As described above, the object identifying device 45 is installed in the first zone, and information identifying an object read by the object identifying device 45 is transmitted to the host control device 46. Then, information of the address of a conveyance destination (target place) and a conveying route of the object itself is transmitted from the host control device 46 to the zone controller 10 of the second zone and is input to the conveyance destination storage unit of the zone controller 10 in the second zone.

The information of the conveying route indicates a zone where a course is changed and the changed course. As described above, the conveyor 1 of the present embodiment includes the linear conveying zones and the conveying direction changing zones. The linear conveying zone only has the function of sending out a conveyed object to the downstream side and thus dose not contribute to the selection of a conveyance destination. In the present embodiment, only the conveying direction changing zone contributes to the selection of a conveyance destination.

Thus, in the present embodiment, the conveying route information includes the address of a conveying direction changing zone and a discharging direction from the conveying direction changing zone. More specifically, the conveying route information includes the address of a conveying direction changing zone where a direction should be changed and a discharging direction from the conveying direction changing zone, but does not include the address of a conveying direction changing zone where the conveying direction is not changed.

In the present embodiment, the host control device 46 functions as the initial information transmitting unit to transmit the conveyance destination information to the zone controller 10 of the second zone.

An object is conveyed to the downstream side without stopping. With the movement of the object, information stored in the conveyance destination storage member 40 of a zone that has received the object is rewritten and information about the conveyance destination is passed on.

When the object has arrived at the conveying direction changing zone (the zone having the address of 3, 5, 18, 20, 22, 25, 29, 35, 38, 40, 46, 50, 53, 61, 64, 67, 71, 75, 77, or 82), the contents of the conveyance destination storage member 40 of the zone controller 10 in the conveying direction changing zone are checked to determine a sending-out direction.

For example, when the object has arrived at the zone of the address 3, the address of the conveyance destination (target place) is transmitted from the second zone on the upstream side to the zone controller 10 of the third zone, and information stored in the conveyance destination storage member 40 of the zone controller 10 in the third zone (conveying direction changing zone) is rewritten. That is, when the object moves from the second zone to the third zone so that the object itself is conveyed across the zones, the conveyance destination information is transferred from the second zone on the upstream side to the third zone on the downstream side with the movement of the object across the zones.

Then, the information is read out. When the address of the conveyance destination is 4 to 8, the direction changing mechanism works. Specifically, after the object is led into the main conveyor 21, the sub conveyor 22 is lifted so as to project above the main conveyor 21, and the motor-incorporating roller of the sub conveyor 22 is driven to discharge the object toward the addresses 4 to 8 (toward the fourth zone to the eighth zone). At this time, the address of the conveyance destination (target place) is transmitted from the third zone (conveying direction changing zone) to the zone controller 10 of the fourth zone, and information stored in the conveyance destination storage member 40 of the zone controller 10 in the fourth zone (linear conveying zone) is rewritten. In this manner, also in the branching point, the conveyance destination information is transferred from the third zone on the upstream side to the fourth zone on the downstream side with the movement of the object across the zones.

In the present embodiment, as described above, the conveying route information includes the address of the conveying direction changing zone where the direction should be changed and the discharging direction from the conveying direction changing zone. When the address of the conveyance destination is 4 to 8, the address 3 is included as the address of the conveying direction changing zone where the direction should be changed, and information of "right" is further included as the carrying out direction.

In the present embodiment, the zone controller 10 of the third zone (conveying direction changing zone) which corresponds to the address 3 receives information of the conveying route from the second zone on the upstream side. When the information includes the own address (address 3), the zone controller 10 operates in accordance with the information and discharges the object toward the addresses 4 to 8.

Then, the zone controller 10 deletes the designation of the own zone from the conveying route information, and transmits information after the designation of the own zone, from the third zone (conveying direction changing zone) to the zone controller 10 of the fourth zone.

When the address of the conveyance destination (target place) transmitted to the third zone together with the object is 9 to 88, the object moves on the main conveyor 21 and is discharged to the ninth zone (address 9). Further, the address of the conveyance destination (target place) is transmitted from the third zone (conveying direction changing zone) to the zone controller 10 of the ninth zone, and information stored in the conveyance destination storage member 40 of the zone controller 10 in the ninth zone (linear conveying zone) is rewritten.

Also in this case, the conveyance destination information is transferred from the third zone on the upstream side to the ninth zone on the downstream side with the movement of the object across the zones.

As described above, the conveying route information does not include the address of the conveying direction changing zone where the conveying direction is not changed. Thus, when the address of the conveyance destination (target place) transmitted to the third zone is 9 to 88, the direction changing mechanism of the conveying direction changing zone does not act.

Similarly, also when the object has arrived at another conveying direction changing zone, the address of the conveyance destination is checked, and the object is discharged to the direction of the checked address. Further, the address of the conveyance destination is transmitted together with the object.

As a result, the object is conveyed from the start position to the target place.

As described above, in the present embodiment, the address of the conveying direction changing zone is included as the conveying route information. Thus, when the received conveying route information includes the address of the own zone, the direction changing mechanism operates. On the other hand, when the received conveying route information does not include the address of the own zone, the direction changing mechanism does not operate.

Figure 9A:
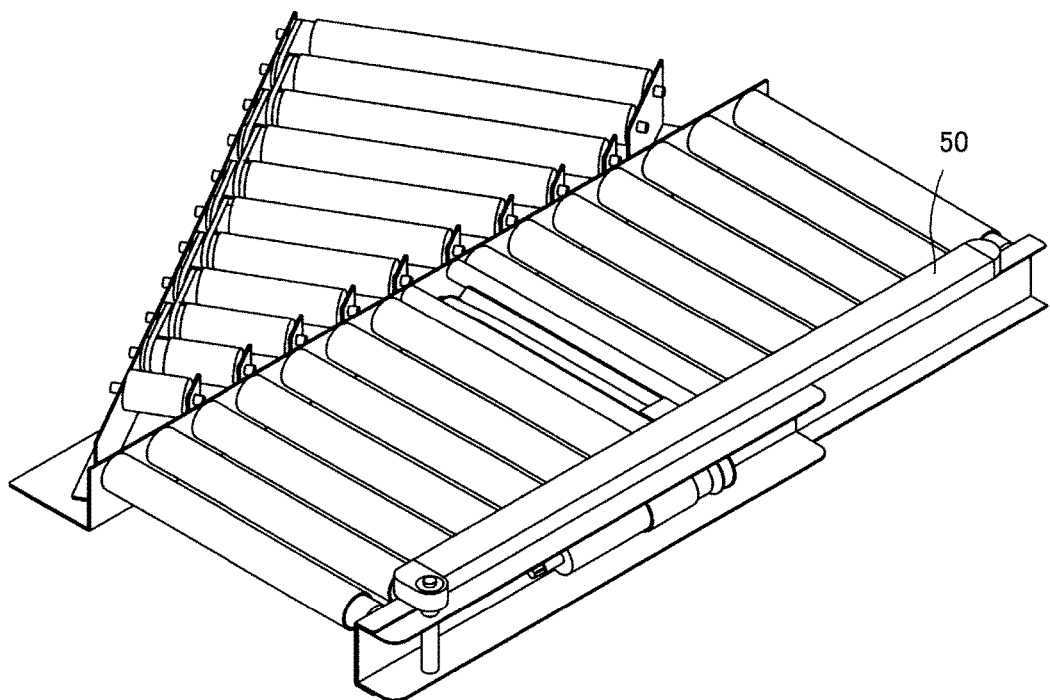
Figure 9B:
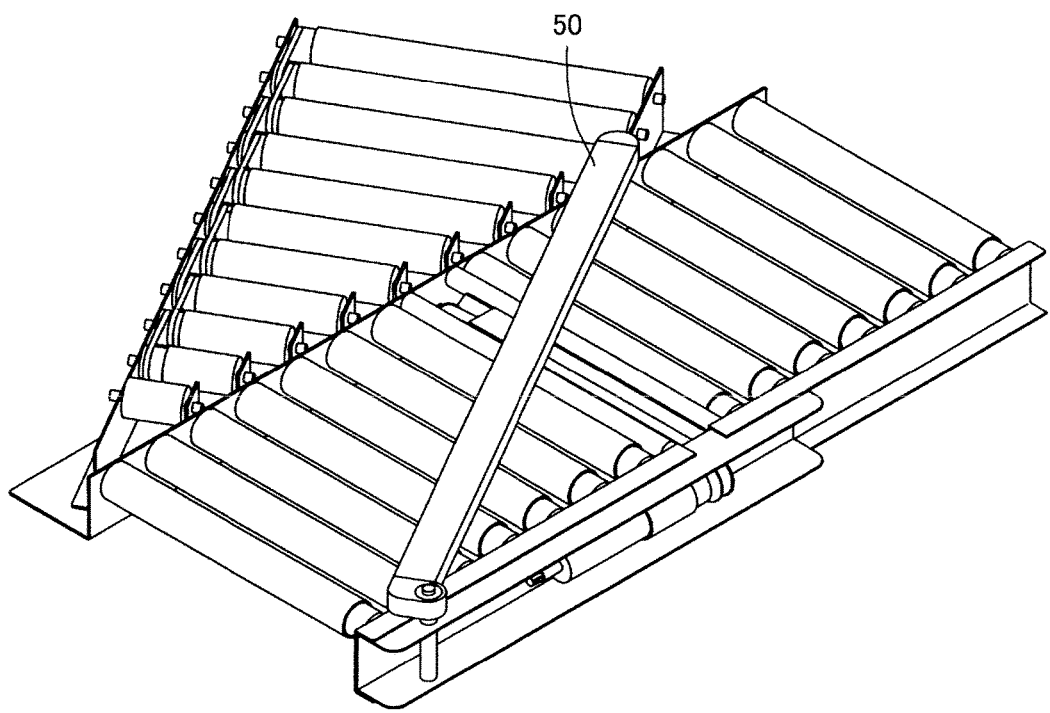
Figure 10:
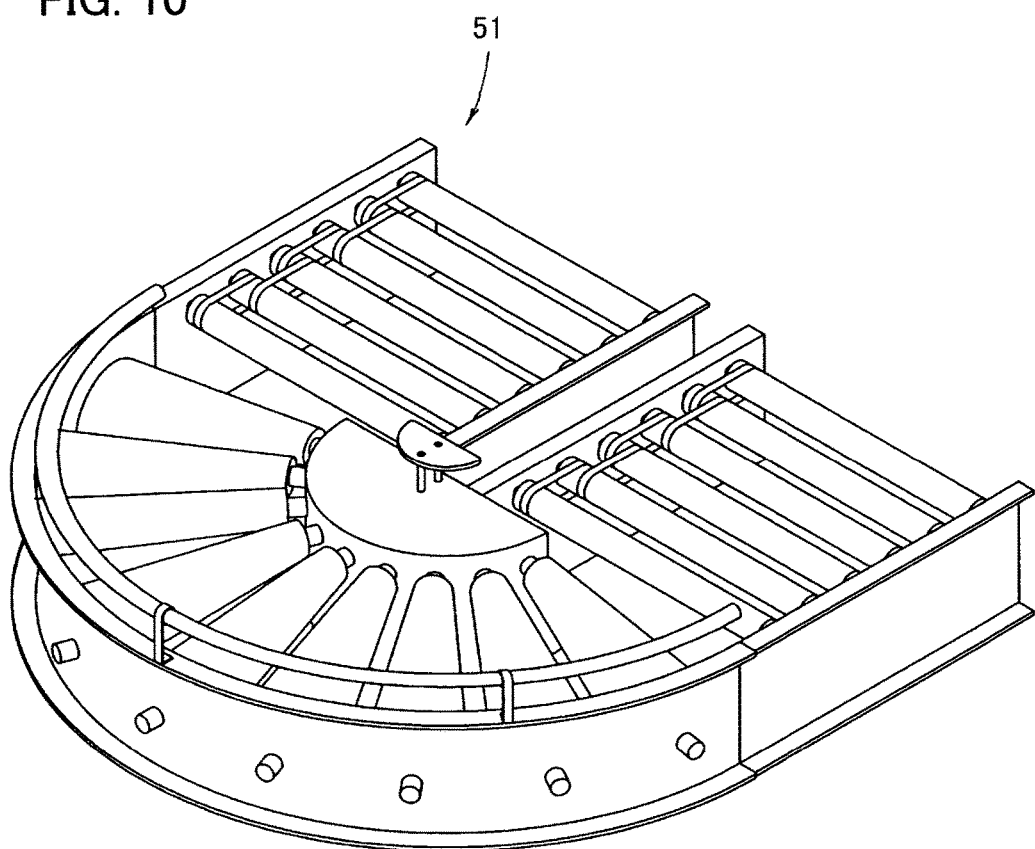
FIG. 10 is a perspective view of a zone conveyor that includes a curved passage.

In the above embodiment, the conveying module that discharges an object in a perpendicular direction is employed in each of the conveying direction changing zones (the zones having the addresses of 3, 5, 18, 20, 22, 25, 29, 35, 38, 40, 46, 50, 53, 61, 64, 67, 71, 75, 77, 82). However, a conveying module as illustrated in FIG. 9 that swings a bar 50 to discharge an object in an oblique direction may be employed. Alternatively, as illustrated in FIG. 10, a. conveying module 51 which includes a curved passage may be employed.

It is recommended that the conveyor 1 of the present embodiment be combined with other devices such as a plurality of conveyors, an automated warehouse, and a self-propelled conveying device to constitute a continuous conveyor system.

Figure 11:
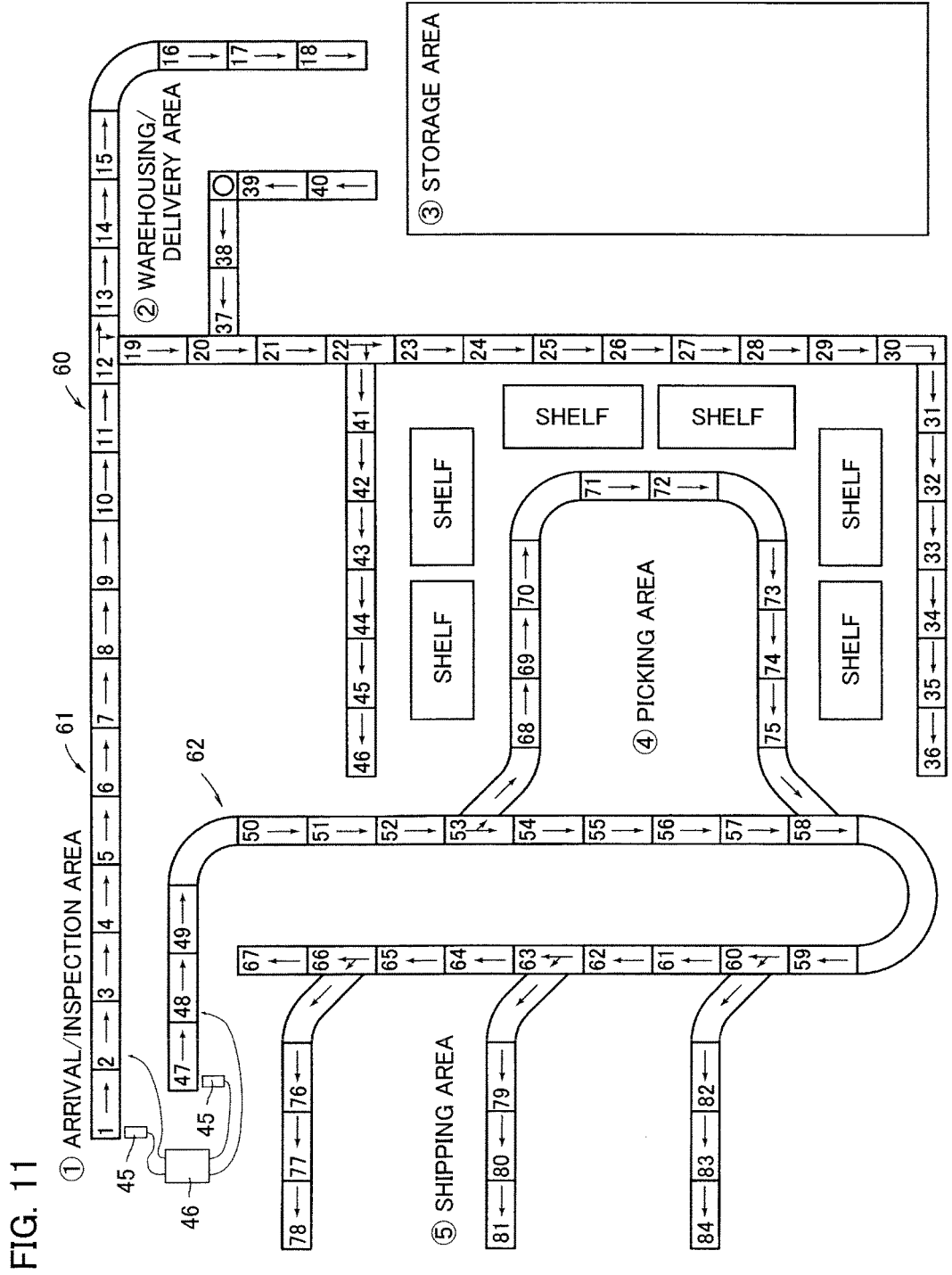
FIG. 11 is the layout of a conveyor and a display screen of a display device according to a second embodiment of the present invention.
Figure 12:
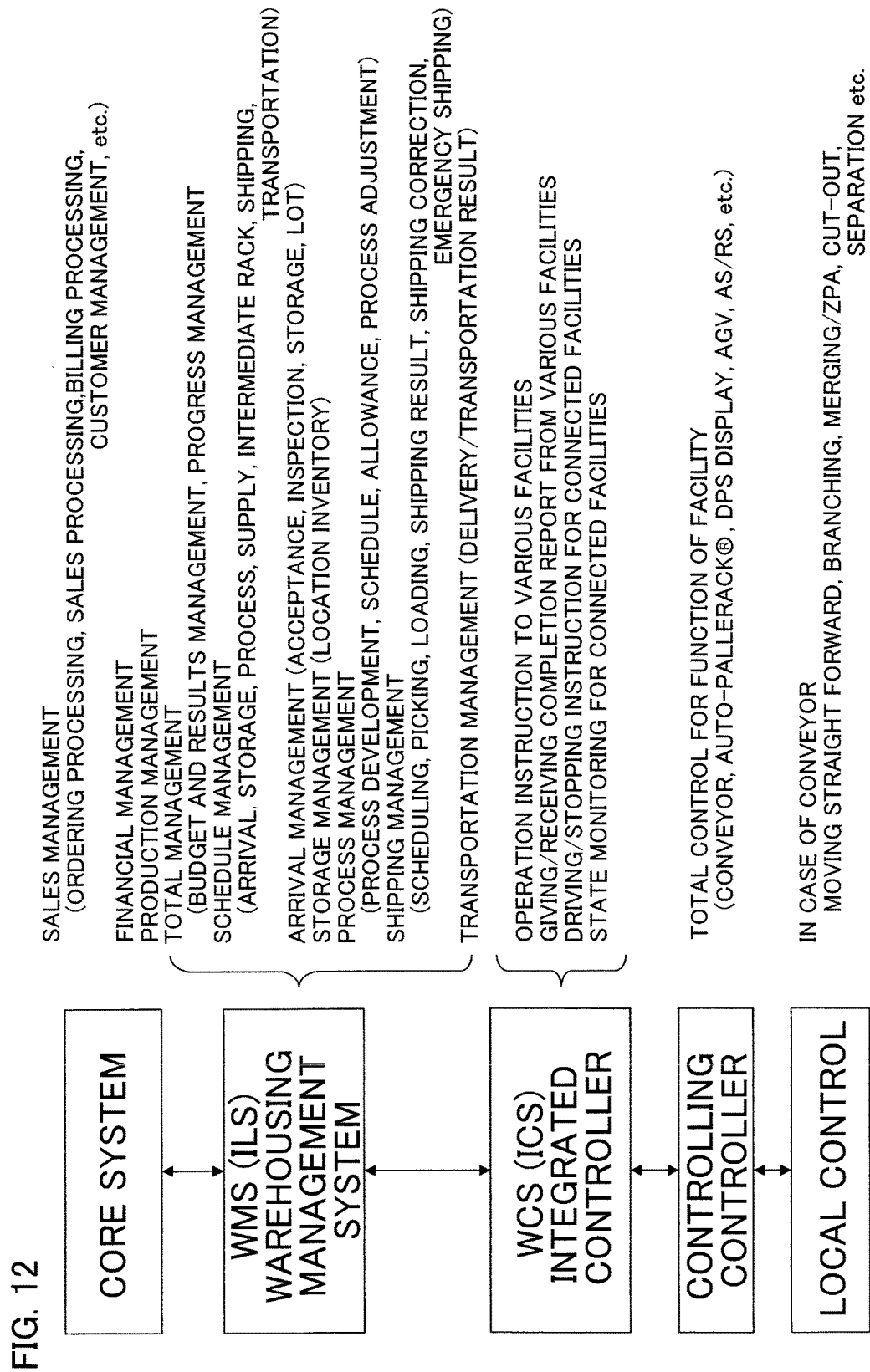
FIG. 12 is a table illustrating the configuration of a control system of the conveyor of the present embodiment.

For example, a control system as illustrated in FIGS. 11 and 12 is constructed, and an integrated controller (WCS) integrally controls a conveyor controller which controls the conveyor 1 and controllers of many devices such as a display.

Further, as illustrated in FIGS. 11 and 12, it is recommended that the conveyor 1 be coupled to a warehousing management system which controls inventory and order of a warehouse.

A conveyor system illustrated in FIGS. 11 and 12 includes the conveyor 1. The conveyor system includes individual control devices each of which individually controls an individual conveyor or equipment included in the conveyor system such as a conveyor controller and a display controller and an integrated controller which integrally controls the individual control devices included in the conveyor system.

A conveyor 60 illustrated in FIG. 11 includes two series of independent conveyors 61, 62. As illustrated in FIG. 11, the conveyor 60 illustrated in FIG. 11 is controlled by one host control device 46 (integrated controller WCS).

It is also recommended that the integrated controller also serve as a conveyor controller which controls the conveyor 1.

The conveyor 1 of the present embodiment and the conveyors 60, 8 (described below) have the following special functions. Hereinbelow, the special functions will be described. The conveyors 1, 60, 8 will be collectively described as the conveyor 1.

CAD Device

In the present embodiment, the design of the conveyor 1 can be performed by a CAD device, Hereinbelow, the CAD device will be described.

(1) A monitor layout can be created using a CAD drawing as an outline.

In the conveyor 1, the display device 33 is provided in the host control device 46 to check an operating state of each unit and to know the presence or absence of stagnation of objects, and a layout diagram as illustrated in FIG. 1 is displayed on the display device 33.

On the other hand, in the conveyor 1 of the present embodiment, each of the devices modularized is combined. When the conveyor 1 is constructed, a working diagram is created as a matter of course. In many cases, the working diagram is created using a CAD.

The conveyor 1 of the present embodiment can take in information of the CAD to create the monitor layout. In the conveyor 1, each component is standardized. Thus, the monitor layout can be created by, for example, tracing the working diagram.

Figure 16A:
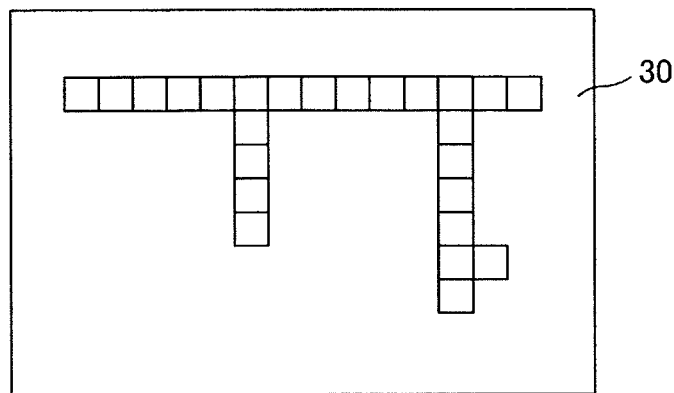
FIG. 16A is a screen of a CAD of an embodiment of the present invention.
Figure 16B:
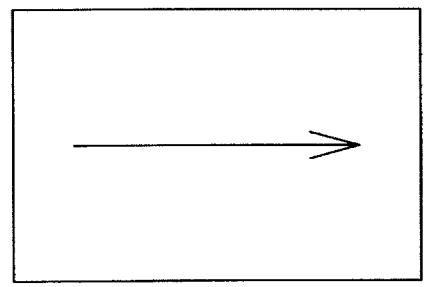
FIGS. 16B and 16C illustrate a part of the screen in an enlarged manner.
Figure 16C:
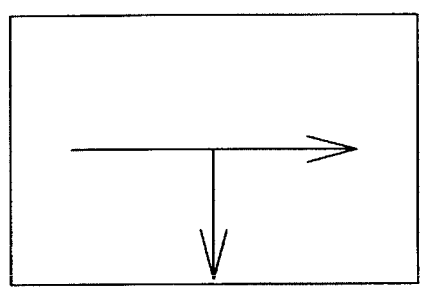

FIG. 16A illustrates an example of a display screen 30 of the CAD device. The CAD device of the present embodiment has a known drawing function. Further, a model diagram representing a function as illustrated in FIG. 2 is stored in the CAD device. An operator creates a layout diagram of the conveyor 1, 60 using the CAD device, and the model diagram of FIG. 2 is designated and fitted into each zone.

The function of each zone is determined by designating the model diagram.

Further, an operator inputs a speed of each zone. The stage of the speed is previously defined such as SPEED 1 and SPEED 2, and an operator designates the stage of the speed.

(2) Address setting of the zone controller can be automatically performed.

In the present embodiment, when the monitor layout is created, the address of each zone can be automatically set by software.

It is needless to say that the address may also be manually set.

Specifically, when the layout diagram is created as illustrated in FIG. 16A, a number or a mark is automatically assigned to each zone. When the already created layout is changed to insert a new zone between zones or to delete the existing zone, a new address is assigned.

(3) The created layout diagram can be rotated by any angle such as 90°, 180°, or 270° in accordance with the installation place of the monitor screen to be observed.

(4) The created layout diagram can be freely scaled up and down in a specified range on the monitor screen.

(5) The address determined by the created layout diagram and an operation program corresponding to the function of each zone can be output in an associated manner.

The operation program corresponding to the function of each zone includes a control program for executing an operation of introducing an object, a control program for operating the direction changing mechanism, and a control program for executing an operation of discharging an object.

The address of the adjacent zone is also output together.

Next, the function of the host control device 46 and the function of the display device 33 connected to the host control device 46 will be described.

(1) An operating state, a load presence state, an abnormal state (abnormal contents and a way of coping with the abnormality) of the conveyor 1 and information of an object can be displayed on the display device 33. That is, the display device 33 displays which zone currently has each object on the monitor.

(2) The display device 33 displays which zone currently has each object on the monitor.

(3) An operator can designate the range of "start/stop" and "emergency stop" of the conveyor in any manner while looking at the display device 33.

For example, only the twenty-first and subsequent zones (the address 21 and the subsequent addresses) illustrated in FIG. 1 may be stopped, and the other part may be made drivable. Alternatively, only a branch passage starts with the sixty-second zone branching of from the sixty-first zone may be stopped.

As illustrated in FIG. 11, for example, when there are a conveying passage that passes through a picking area and a conveying passage that bypasses the picking area, the conveying passage passing through the picking area may be stopped to convey an object directly to a shipping area.

In the conveyor 60 illustrated in FIG. 11, the conveying passage is divided at the twelfth zone (address 12) into a conveying passage toward a storage area and a conveying passage toward a shelf in the picking area. The conveying passage toward the storage area may be stopped to convey all objects to the shelf in the picking area.

When an emergency stop button (not illustrated) is operated, only a zone in an area near the button-operated place may be stopped, and a stopping area in this case may be previously determined.

(3) An operator can provide an instruction of the "number collecting operation", the "ratio branching operation", the "congestion avoiding operation", or the "merging operation" while looking at the display device 33.

(4) A starting point (start) name and a destination (goal) name for creating a conveying command can be registered.

Although, in the first embodiment, the start position is only the first zone (address 1), the name of the position can be determined in any manner. In the first embodiment, there are a plurality of conveyance destinations (target places) of objects (addresses 6, 8, 23, 27, 30, 41, 44, 51, 54, 65, 72, 73, 78, 79, 83, 86, 88, 90). Names can be applied to these conveyance destinations in any manner. For example, when the conveyor is installed in a distribution center, names such as "FUJITA SHOP" and "OHMINAMI STORE" can be applied according to delivery destinations.

(5) Conditions for branching/merging can be set.

For example, as illustrated in FIG. 11, there may be a plurality of rows of shipping zones in the shipping area. In the example illustrated in FIG. 11, the shipping area includes a first shipping zone from the seventy-sixth zone to the seventy-eighth zone, a second shipping zone from the seventy-ninth zone to the eighty-first zone, and a third shipping zone from the eighty-second zone to the eighty-fourth zone.

When there are a plurality of rows of shipping zones in this manner, objects may be preferentially sent out to a specific shipping zone (first-arrival priority), objects may be distributed in such a manner that the same number of objects are constantly held in actuality between the shipping zones even when an object is discharged from the shipping zone (equal distribution), or the number of objects sent to the respective shipping zones may be equalized (alternate control). In the present embodiment, these conditions can be set.

(6) There is an algorithm for the branching/merging operation.

Standard patterns such as the "first-arrival priority", the "equal distribution" and the "alternate control" are stored in the host control device 46.

(7) A completion report in response to a command can be transmitted to a host system (WMS).

There is the function of reporting that an object has arrived at the destination to the host system (WMS).

Figure 13:
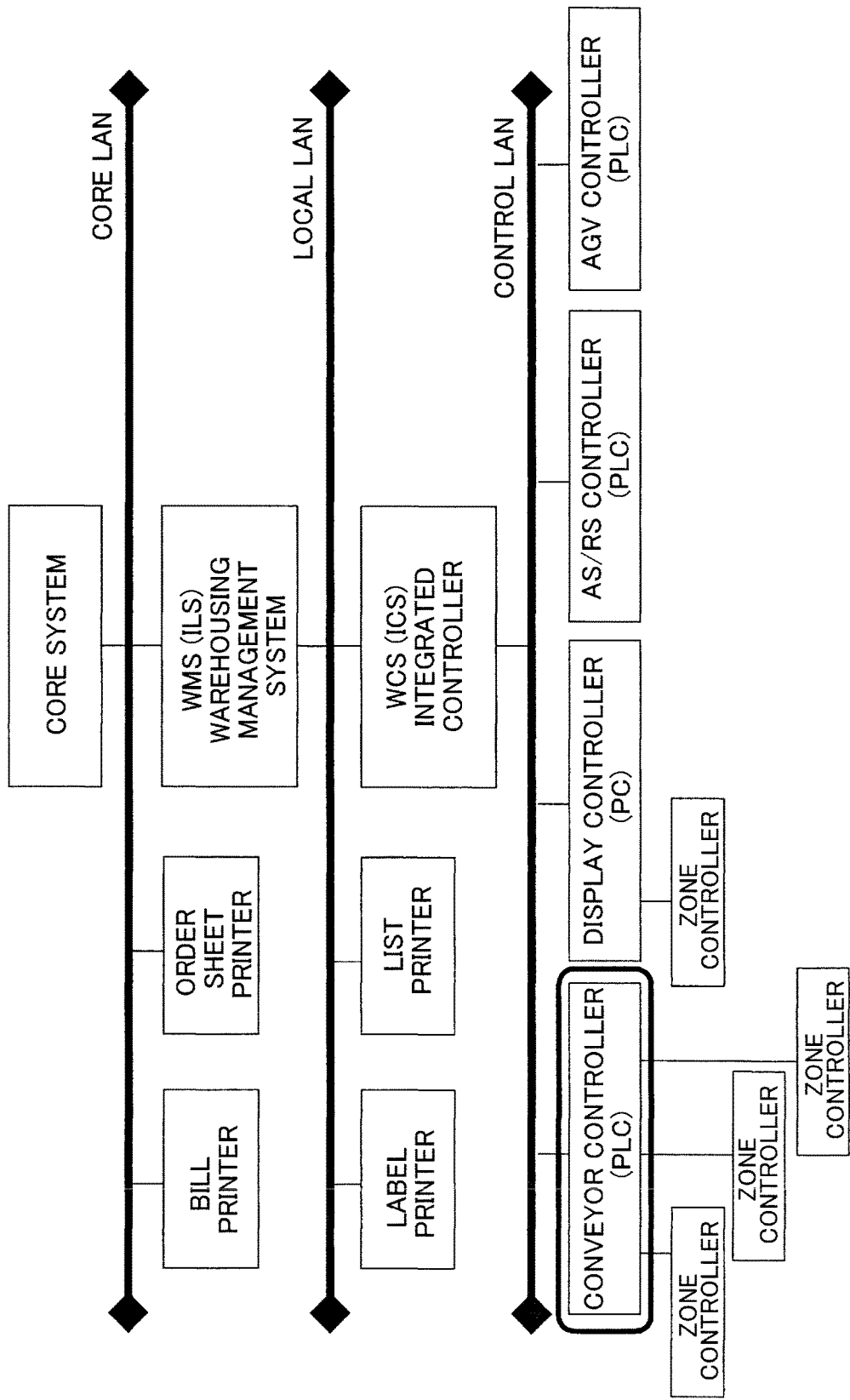
FIG. 13 is a configuration diagram illustrating the control system of the conveyor of the present embodiment.
Figure 14:
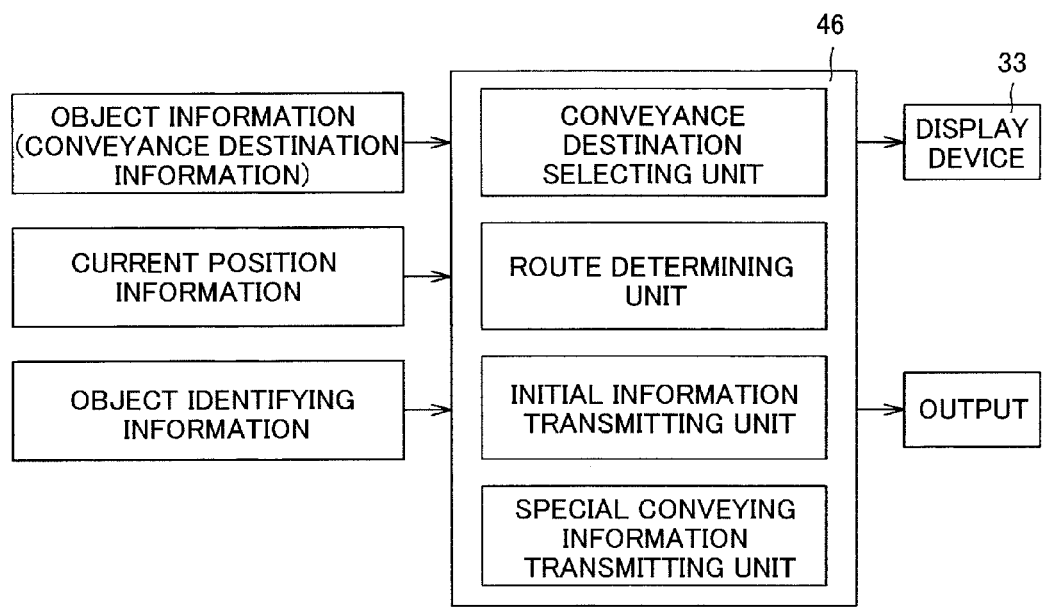
FIG. 14 is a block diagram of an integrated controller employed in the conveyor of the present embodiment.

In the present embodiment, as illustrated in FIG. 13, the host control device 46 is further connected to the warehousing management system (WMS). In the present embodiment, information indicating that an object has arrived at the destination is automatically input to the integrated controller (ICS) and the warehousing management system (WMS).

(8) Layout change can be coped with.

Figure 15:
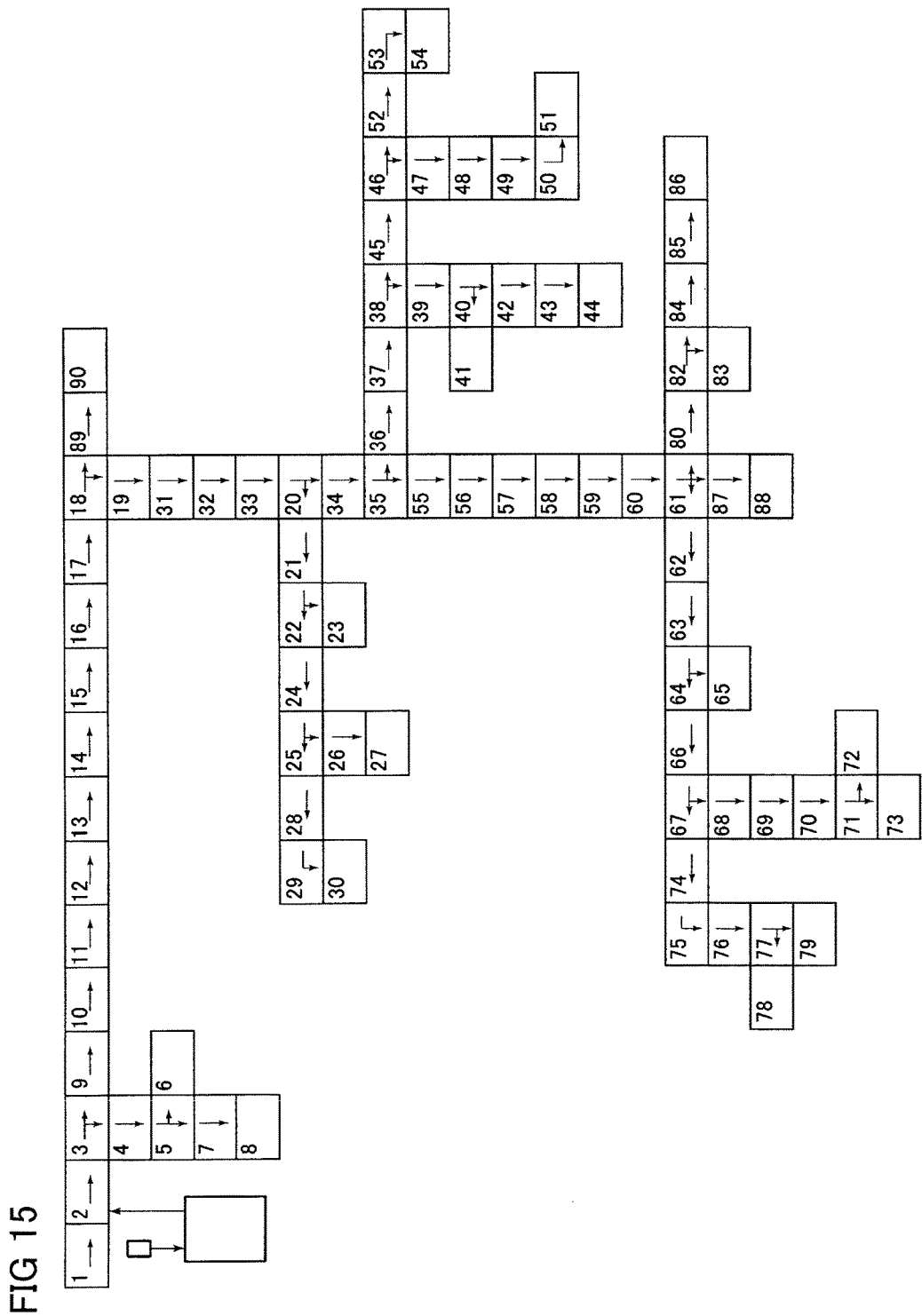
FIG. 15 is the layout of a conveyor which is changed from the layout of the conveyor illustrated in FIG. 1.

For example, the layout of the conveyor 1 as illustrated in FIG. 1 is changed to a layout as illustrated in FIG. 15.

As described above, the addresses are assigned to the respective zones which constitute the conveyor 1. In the present embodiment, layout change can be performed by exchanging the zones with the addresses assigned.

The layout illustrated in FIG. 15 is formed by relocating the zones of the addresses 21 to 30 in FIG. 1 to the downstream side in their entirety. That is, the zones of the addresses 21 to 30 in FIG. 1 are inserted between the addresses 33 and 34 of FIG. 1.

In the present embodiment, an object can be conveyed to a desired zone using the same input means also after the layout change.

Hereinbelow, description thereof will be made.

In the present embodiment, as described above, the address of a conveying direction changing zone where the direction should be changed and the discharging direction of the conveying direction changing zone are included as the conveying route information. Further, as described above, the address of a conveying direction changing zone where the conveying direction is not changed is not included in the conveying route information.

When the address of the conveyance destination is 21 to 30, the direction changing place in the position of the original layout is replaced with the linear conveying zone (address 31), The zone of the address 31 is not included in the conveying route information. Thus, the object moves straight forward on the zone of the address 31. When, the object has arrived at the zone of the address 20, the direction changing mechanism of the conveying direction changing zone 20 operates to discharge the object toward the zone of the address 21.

In this manner, in the present embodiment, an object can be conveyed to a desired zone using the same input means also after the layout change.

(9) During the construction, an actual arrangement (wiring) error of a conveying unit is notified.

As a preferred method for manufacturing the conveyor 1 of the present embodiment, an address is assigned to each module in a factory as described below. In this case, the conveying modules are connected to each other in a construction site. When there is a wiring error in the connection of the conveying modules, the error is displayed, for example, on a display screen of the host control device 46.

The conveyor 1 further has the following functions.

(1) When an automatic identification device such as a bar code reader is connected to the control device of the conveyor, the control device of the conveyor automatically recognizes the bar code reader and can perform necessary setting by an interactive method.

(2) When an object is a tray or a container, an individual ID is set to the tray, and a conveyance destination (target place) of the object and information obtained from the bar code reader are associated with each other.

This function is as described above.

(3) A conveying command can be created on the basis of a command from the host system (WMS).

For example, the control system as illustrated in FIGS. 12 and 13 is constructed, and the integrated controller (WCS) integrally controls the conveyor controller and the controllers of many devices such as a display. The conveyor controller is connected to the zone controller so that an operation condition of each zone is obtained. A conveying command can be created on the basis of a command from the warehousing management system (WMS) which is a host system of the integrated controller (WCS).

(4) An ID of a tray and conveyance destination information can be transmitted to the zone controller.

This function is as described above.

(5) The control device (the host control device 46) of the conveyor has an interface function with other system constituting devices (e.g., a DPS display, a printing machine, a weighing machine, and a robot).

Although, in the above embodiment, the object identifying device 45 is provided in the first zone as the start position, the position of the object identifying device 45 may be any position on the upstream side with respect to the conveying direction changing zone. Further, a plurality of object identifying devices 45 may be provided at a plurality of positions.

In the above embodiment, information read by the object identifying device 45 is transmitted to the host control device 46, and the host control device 46 identifies an object, makes an inquiry about a conveyance destination (target place) of the object, and transmits the address thereof to the zone controller 10 of the second zone (initial information transmitting unit).

However, the present invention is not limited to this configuration. An IC tag that identifies a conveyance destination may be attached to an object itself, the object identifying device 45 may read information about the conveyance destination stored in the IC tag, and the read information may be transmitted to the zone controller 10 of the first zone or the subsequent zone (initial information transmitting unit).

The address may be transmitted to the zone controller 10 of a zone that is located on the downstream side with respect to the second zone.

Figure 17:
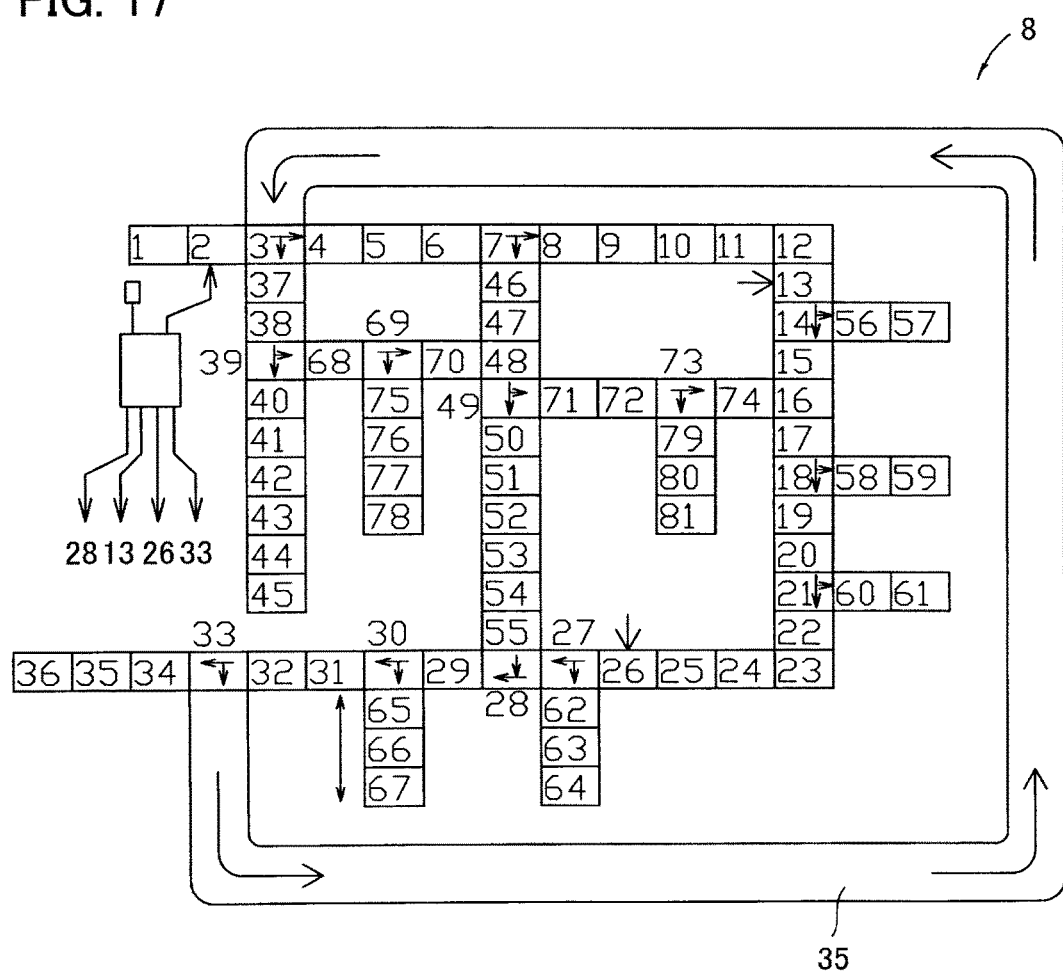
FIG. 17 is the layout of a conveyor and a display screen of a display device according to a third embodiment of the present invention.

A conveyor 8 which includes a circulation route 35 as illustrated in FIG. 17 may be employed as an example of the layout of the conveyor. The circulation route 35 connects the thirty-third zone and the third zone as illustrated in FIG. 17 and returns an object on the thirty-third zone located near the end of the layout to the third zone near the start.

The conveyor 8 illustrated in FIG. 17 is capable of conveying an object through a plurality of routes. For example, when an object is conveyed to the thirty-sixth zone at the end, there are an outer track route starting from the first zone, passing through the twelfth zone and the twenty-third zone, and reaching the thirty-sixth zone and an inner track route starting from the first zone, turning right at the seventh zone to enter the forty-sixth zone, merging with the outer track route at the twenty-eighth zone, and reaching the thirty-sixth zone.

In the conveyor 8 illustrated in FIG. 17, some of linear conveying zones can be driven in both forward and reverse directions. Specifically, in the sixty-fifth zone, the sixty-sixth zone, and the sixty-seventh zone, an object can be returned from the sixty-seventh zone to the sixty-fifth zone by operating a manual switch.

In addition, the conveyor 8 illustrated in FIG. 17 is capable of performing the "number collecting operation", the "ratio branching operation", the "congestion avoiding operation", and the "merging operation".

In the present embodiment, the "ratio branching operation" is performed in the thirteenth zone. The "number collecting operation" is performed in the twenty-sixth zone. The "congestion avoiding operation" is performed in the thirty-third zone. The "merging operation" is performed in the twenty-eighth zone.

The "ratio branching operation" will be described.

In the conveyor 8 of the present embodiment, all the fifty-seventh, fifty-ninth, and sixty-first zones are conveyance destinations of objects to be mounted on trucks or containers used for transportation to the same conveyance destination (e.g., FUJITA SHOP). Thus, objects may be carried into any of the zones.

In the present embodiment, the first conveyance destination position of all objects that should be conveyed to the fifty-seventh, fifty-ninth, and sixty-first zones is the thirteenth zone located before the branching point. Specifically, the address 13 is designated as the first initial information to the conveyance destination storage member 40 of the zone controller 10 in the second zone.

Any one of the addresses 57, 59, and 61 is transmitted as the second initial information from the host control device 46 to the zone controller 10 of the thirteenth zone (address 13). That is, in the present embodiment, the host control device 46 transmits the second initial information to the zone controller 10 of the thirteenth zone. For example, the addresses 57, 59, and 61 are sequentially transmitted to the zone controller 10 of the thirteenth zone.

An object arrives at the zone of the address 13 in accordance with the first initial information transmitted to the zone controller 10 of the second zone.

When information indicating that the object has arrived at the thirteenth zone (address 13) is returned to the host control device 46 from the zone controller 10 of the thirteenth zone, the host control device 46 transmits the second initial information to the zone controller 10 of the thirteenth zone. Objects are sequentially conveyed to the zones of the addresses 57, 59, and 61 in accordance with the second initial information.

As described above, in the "ratio branching operation", the "alternate system", the "priority system" or the "proportional system" can be selected.

Next, the "number collecting operation" will be described.

For example, there may be a case in which objects are conveyed by two toward the sixty-fourth zone (address 64).

In this case, the "number collecting operation" is performed.

Specifically, when the host control device 46 receives information indicating that an object whose destination position is the sixty-fourth zone has arrived at the twenty-sixth zone (address 26) from the zone controller 10 of the twenty-sixth zone, the host control device 46 transmits a temporary stop command to the zone controller 10 of the twenty-sixth zone. As a result, one object whose final destination is the sixty-fourth zone is stopped in the twenty-sixth zone.

Then, when another object whose final conveyance destination is the sixty-fourth zone has arrived at the twenty-fifth zone just before the twenty-sixth zone, the host control device 46 cancels the temporary stop command. As a result, the two objects whose final destination is the sixty-fourth zone are continuously conveyed to the downstream side.

Next, the "congestion avoiding operation" will be described.

In the present embodiment, as described above, each zone controller 10 and the host control device 46 are coupled through the communication means. Each zone controller 10 inputs information of the load presence sensor S and information of an object on the corresponding zone to the host control device 46.

In the present embodiment, when the fact that an object cannot move forward due to congestion of objects in the thirty-fourth, thirty-fifth, and thirty-sixth zones on the most downstream side is turned out from information from the zone controllers 10 of the respective zones and this state is continued for a certain time, the host control device 46 transmits a command for forcibly changing the discharging direction toward the circulation route 35 to the zone controller 10 of the address 33.

As a result, the object flows to the circulation route 35 and returns to the third zone at the start side so that the congestion is eliminated. In the present embodiment, the circulation route 35 is interposed in the intermediate part, and the conveyance destination information is transferred from the thirty-third zone on the upstream side in the conveying direction to the third zone on the downstream side.

That is, when an object moves from the thirty-third zone to the third zone so that the object is conveyed across the zones, the conveyance destination information is transferred from the zone controller 10 of the thirty-third zone on the upstream side to the zone controller 10 of the third zone on the downstream side with the movement of the object across the zones.

Also when an object stays in a specific zone for a long time regardless of whether there is a congestion of objects in a specific area, the host control device 46 transmits a command for forcibly changing the discharging direction toward the circulation route 35 to the zone controller 10 of the thirty-third zone.

As a result, the object flows to the circulation route 35 and returns from the thirty-third zone to the zone of the address 3 at the start side, so that the congestion is eliminated.

Next, the "merging operation" will be described.

in the conveyor 8 of the present embodiment, an object conveyed through the forty-sixth zone and an object conveyed through the eighth zone join together at the twenty-eighth zone.

As described above, in the present embodiment, the two systems of "alternate merging" and "lot merging" can be selected.

The "alternate merging" is executed as the function of the zone controller 10 of the twenty-eighth zone. That is, a program of the "alternate merging" is previously stored in the zone controller 10 of the twenty-eighth zone, and the "alternate merging" is executed according to a command from the host control device 46.

On the other hand, when the "lot merging" is performed, the host control device 46 transmits a temporary stop command to the zones (the twenty-seventh zone and the fifty-fifth zone) located on the upstream side of the twenty-eighth zone. The twenty-eighth zone is controlled according to the command of the host control device 46, and objects are sent out to the downstream side when a predetermined number of objects have been collected on the upstream side of the twenty-eighth zone.

Next, a preferred method for manufacturing the conveyor 1, 8, 60 will be described.

In the conveyor 1, 8, 60 of the present embodiment, conveying modules are separately manufactured, and, in the zone controller 10 of each of the conveying modules, the address of the own zone, the address of the adjacent zone, and a program for controlling the operation of the motor and the direction changing mechanism of each module are stored. Then, the conveying modules in this state are transported into a construction site and assembled.

That is, in the present embodiment, the conveying modules are separately manufactured. Each of the conveying modules includes the mechanical mechanism part and the zone controller 10 which are integrated with each other.

The conveying module can be standardized and has high versatility.

When the conveyor 1, 8, 60 is manufactured, the layout thereof is determined by the CAD device described above.

Then, a program for controlling the operation of the motor and the direction changing mechanism of each module is stored in the zone controller 10 of each of the conveying modules which have been separately manufactured directly from the CAD device or through another device. More specifically, the address determined by the layout, the address of the adjacent zone, and an operation program corresponding to the function of each zone are output from the CAD device and stored in the zone controller 10 of the conveying module.

At this time, the conveying modules are not combined with each other. The conveying modules are individually separated or separated into a plurality of groups. In this state, the address and the operation program are output to the zone controller 10 of each of the conveying modules and stored in the memory of the zone controller 10.

For example, the conveying module that constitutes the conveying direction changing zone includes, as the mechanical structure, the direction changing mechanism which switches the conveying direction or the carrying-in direction as illustrated in FIGS. 5 and 9. The conveying module is capable of carrying in an object from one or more of carrying-in directions and carrying out an object to one or more of conveying directions.

In the conveying module that constitutes the conveying direction changing zone, a control program for executing an operation of introducing an object, a control program for operating the direction changing mechanism, and a control program for executing an operation of discharging an object are stored, in addition to the address, in the accompanying zone controller.

The conveying module that constitutes the conveying direction changing zone includes the mechanical structure which conveys an object placed thereon and the zone controller which controls the mechanical structure, the mechanical structure and the zone controller being integrated with each other. The mechanical structure includes the direction changing mechanism which switches the conveying direction or the carrying-in direction and is capable of carrying in an object from one or more of carrying-in directions, and carrying out an object to one or more of conveying directions. The zone controller of the conveying direction changing zone includes a control unit for executing an operation of introducing an object, a control unit for operating the direction changing mechanism, and a control unit for executing an operation of discharging an object.

In the conveying module that constitutes the linear conveying zone, a control program for executing an operation of introducing an object and a control program for executing an operation of discharging an object are stored, in addition to the address, in the zone controller 10.

The conveying modules are individually manufactured. Then, the conveying modules including the zone controllers 10 with the programs individually written therein are packed and transported to the construction site.

In the construction site, the conveying modules are arranged according to the layout, and mechanically and electrically connected.

As a result, the conveyor 1, 60, 8 as illustrated in FIG. 1, 11, 17 can be assembled in the construction site.

According to the manufacturing method of the present embodiment, it is not necessary to assemble the conveyor 1, 60, 8 in the manufacturing factory. Thus, even when the manufacturing factory is small, the large conveyors 1, 60, 8 can be manufactured.

In the conveyor of each of the above embodiments, the display device 33 is connected to the host control device 46 as described above, and the display device 33 displays which zone currently has each object on the monitor.

Figure 18:
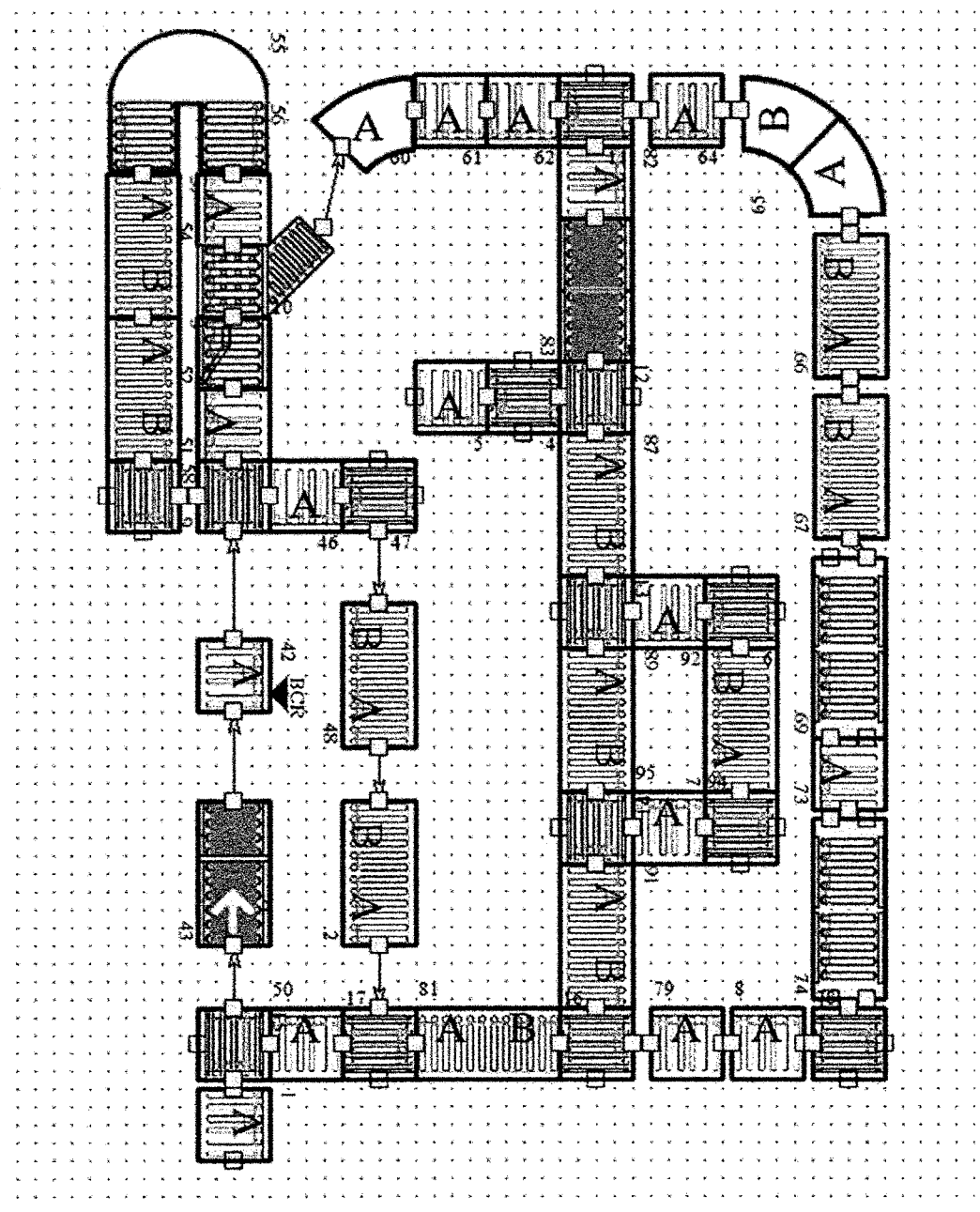
FIG. 18 is a front view of a monitor screen illustrating an example of monitor display displayed on a display device of a host control device and illustrates the layout of a conveyor of a fourth embodiment of the present invention.

FIG. 18 illustrates an example of the monitor display.

In FIG. 18, "A" and "B" represent objects.

In the present embodiment, the straight part of the conveying passage is divided into a plurality of linear conveying zones. In the present embodiment, two linear conveying zones are paired and controlled by one zone controller.

Thus, a conveying module of the linear conveying zone is a roller conveyor having a length that enables the roller conveyor to place two objects thereon. Further, two pairs of load presence sensors S are provided in the roller conveyor.

Although, in the above embodiment, the conveyance destination information is transferred between adjacent zones in principle, an intermediate part may be skipped in information transmission.

For example, in the conveyor 1 illustrated in FIG. 1, information about the conveyance destination may not be transferred between the tenth zone and the seventeenth zone, and the conveyance destination information may be transferred from the tenth zone to the eighteenth zone when an object has arrived at the eighteenth zone from the tenth zone.

In this configuration, when an object moves from the tenth zone to the eighteenth zone so that the object is conveyed across the zones, the conveyance destination information is transferred from the tenth zone on the upstream side to the eighteenth zone on the downstream side with the movement of the object across the zones.

In the above embodiment, each zone has a length that enables the zone to place at least one object thereon. Hereinbelow, an embodiment capable of conveying an object that has a length longer than the zone will be described.

Figure 19:
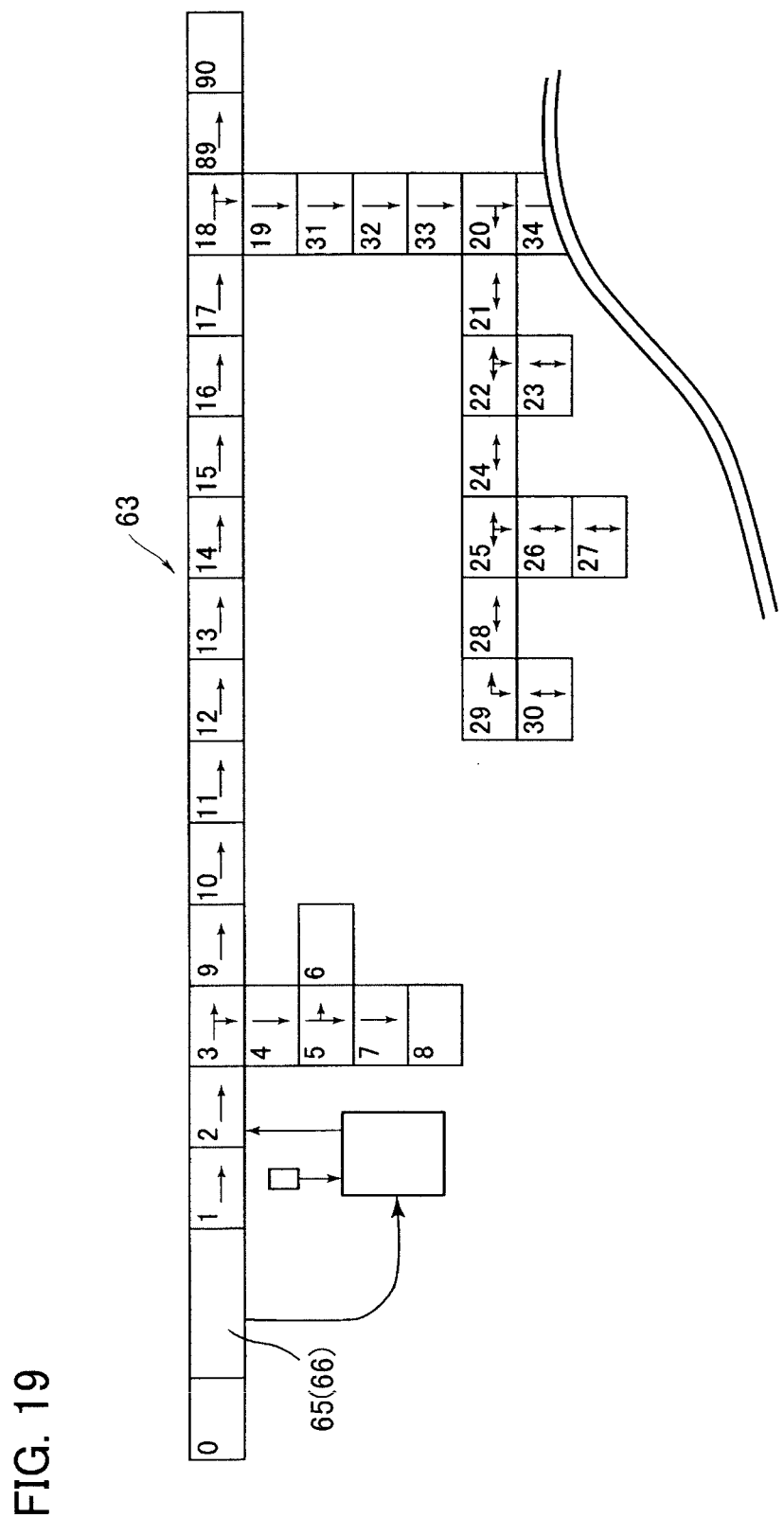
FIG. 19 is the layout of a conveyor and a display screen of a display device according to a fifth embodiment of the present invention.

A conveyor 63 of a fifth embodiment illustrated in FIG. 19 has the same layout as the conveyor 1 of the first embodiment and includes a total length measuring device 65 which is disposed on the start part of the conveyor 1 and measures the total length of an object. The total length measuring device 65 includes a conveyor 66 and an optical length measuring device attached to the conveyor 66.

The total length measuring device 65, for example, stops an object on the conveyor 66 and measures the total length of the object using the length measuring device. Alternatively, the total length measuring device 65 drives the conveyor 66 at a constant speed and measures the total length of an object on the basis of a passage time at a certain position or a rotation rate of a motor.

The conveyor 63 includes a zone of an address 0 and places an object on the zone of the address 0. The zone of the address 0 conveys the object toward the total length measuring device, and the total length measuring device 65 measures the total length of the object.

The measured data is transmitted from the total length measuring device 65 to the host control device 46.

When the total length of an object measured by the total length measuring device 65 is shorter than the length of each zone, objects are placed on the respective zones one by one and conveyed toward the downstream side as described above.

In the conveyor 63 of the present embodiment, the host control device 46 also transmits information about the length of an object together with the conveyance destination information to the zone controller 10 of the second zone, and the transmitted information is input in the conveyance destination storage member 40 of the zone controller 10 in the second zone.

Each of the subsequent zones receives the information about the length of the object from the zone controller 10 on the upstream side, and can stop the object at a certain position in each zone.

For example, when the load presence sensor S is disposed near the length-direction center of each zone, an object can be stopped at a certain position (e.g., the center) of the zone conveyor by stopping the zone conveyor after a certain time from the passage of the object through the load presence sensor S on the basis of the information about the length of the object.

When the total length of an object measured by the total length measuring device 65 is longer than the length of each zone, the object is stopped across adjacent zones in the subsequent zones.

That is, also when the total length of an object is longer than the length of each zone, the host control device 46 transmits information about the length of the object together with the conveyance destination information to the zone controller 10 of the second zone. Each two of the zones operate in a pair for the long object.

In the conveyor 1 of the first embodiment, all the linear conveying zones convey an object only in one direction. On the other hand, in the conveyor 63 of the fifth embodiment, linear conveying zones in many areas can move an object in both forward and reverse directions.

Specifically, as illustrated in FIG. 19, all the twenty-first to thirty zones can be driven in the forward and reverse directions and can move an object in both the directions.

EXPLANATION OF REFERENCE SIGNS 1, 8, 60 63: conveyor
2: zone conveyor (conveying module of linear conveying zone)
10: zone controller
20: transfer device (conveying module of conveying direction changing zone)
33: display device
40: conveyance destination storage member (conveyance destination storage unit)
41: transmission and reception unit (information receiving unit, information transmitting unit)
45: object identifying device
46: host control device (initial information transmitting unit)
51: conveying module
S: load presence sensor

The invention claimed is:

1. A conveyor for conveying an object from a start position to a target place,
the conveyor comprising:
a plurality of zones into which the conveyer is divided, the object being conveyed across the zones;
at least one object identifying device; and
an initial information transmitting unit transmitting a conveyance destination information of the object itself to any of the zones,
each of the zones comprising:
a linear conveying zone that linearly conveys the object;
a conveying direction changing zone selecting a conveying direction of the object to send out the object in the selected conveying direction;
a conveyance destination storage unit temporarily storing the conveyance destination information;
an information receiving unit receiving the conveyance destination information from an upstream zone; and
an information transmitting unit transmitting the conveyance destination information to a downstream zone,
wherein the conveyor transfers the conveyance destination information from the upstream zone to the downstream zone as an incident of detected movement of the object across the zones.

2. The conveyor according to claim 1,
wherein the linear conveying zone individually has power to allow the linear conveying zone to be driven and stopped independently from the other zones,
wherein the linear conveying zone includes a load presence sensor that detects whether the object is present thereon, and
wherein the conveyance destination information stored in the conveyance destination storage unit is deleted and/or rewritten on the basis of whether the linear conveying zone has been driven and whether the load presence sensor has detected presence of the object.

3. The conveyor according to claim 1,
wherein the linear conveying zone individually has power to allow the linear conveying zone to be driven and stopped independently from the other zones,
wherein the linear conveying zone includes a load presence sensor that detects whether the object is present thereon, and
wherein the conveyance destination information stored in the conveyance destination storage unit is rewritten when the linear conveying zone has been driven and the load presence sensor has changed from a state of not detecting the presence of the object to a state of detecting the presence of the object.

4. The conveyor according to claim 1, wherein a unique address is set to each of the zones.

5. The conveyor according to claim 4, wherein the unique address is automatically settable.

6. The conveyor according to claim 1, wherein the conveyor further comprises a display device that displays a layout of the conveyor.

7. The conveyor according to claim 6, wherein the conveyor allows taking in drawing information created by another device to create a layout to be displayed on the display device.

8. The conveyor according to claim 1,
wherein each of the zones comprises:
a load presence sensor that detects whether the object is present thereon; and
a zone controller to which a signal of the load presence sensor is input,
the zone controller controlling one or more of the zones,
the zone controller comprising the conveyance destination storage unit, the information receiving unit, and the information transmitting unit.

9. The conveyor according to claim 1, wherein the conveyor has any of the following functions:
(1) a number collecting function of conveying the objects to the downstream side when a specified number of the objects have been collected in some of the zones;
(2) a ratio branching function of distributing the objects to a plurality of the conveyance destinations to which the objects can be conveyed; and (3) a congestion avoiding function of making the object take a detour when there is a congestion in the conveyance destination.

10. The conveyor according to claim 1, wherein the conveyor further comprises a conveyance destination selecting unit identifying the conveyance destination of the object with the object identifying device, wherein the initial information transmitting unit transmits information about the identified conveyance destination to any of the zones.

11. The conveyor according to claim 10, wherein the conveyance destination selecting unit comprises a route determining unit for determining a conveying route, and the initial information transmitting unit transmits information about the conveying route to any of the zones.

12. The conveyor according to claim 10, wherein when there are a plurality of conveying routes, the conveyance destination selecting unit is capable of performing a search for the shortest conveying route among the conveying routes.

13. The conveyor according to claim 10, wherein when there are a plurality of conveying routes, the conveyance destination selecting unit is capable of performing a search for one of the conveying routes that enables the object to arrive at the conveyance destination within the shortest time among the conveying routes.

14. The conveyor according to claim 1, wherein information about the conveyance destination includes the following information:
    (1) information about the zone where the conveying direction is changed, and the conveying direction in the zone.

15. The conveyor according to claim 1, wherein each of the zones has a length that enables the zone to place at least one object thereon.

16. The conveyor according to claim 1, wherein some or all of the linear conveying zones are capable of conveying the object in both forward and reverse directions.

17. The conveyor according to claim 1, further comprising a total length measuring device that measures total length of the object.

18. A conveyor system comprising the conveyor according to claim 1 and another equipment, or comprising a plurality of the conveyors,
    wherein the conveyor system comprises individual control devices that individually control the conveyor and the equipment included in the conveyor system and an integrated controller that integrally controls the individual control devices included in the conveyor system.

19. A CAD device that designs the conveyor according to claim 1, the CAD device comprising:
    a layout creating unit for creating a layout of the conveyor that comprises the zones;
    a layout displaying unit for displaying the layout;
    an information inputting unit for writing at least following information; and
    an information outputting unit for outputting the information:
    (1) information about a position of the zone;
    (2) information about an operation of the zone.

20. The CAD device according to claim 19, wherein the information includes information identifying an adjacent zone.

21. A method for manufacturing the conveyor according to claim 1, comprising:
    manufacturing a conveying module that comprises: a control device having a writable memory; and a mechanical structure of each of the zones, the control device and the mechanical structure being integrated with each other;
    writing information written into a CAD device according to claim 19 or 20 into the memory of the conveying module;
    wherein the CAD device that designs the conveyor comprises:
    a layout creating unit for creating a layout of the conveyor that comprises the zones;
    a layout displaying unit for displaying the layout;
    an information inputting unit for writing at least following information; and
    an information outputting unit for outputting the information:
    (1) information about a position of the zone;
    (2) information about an operation of the zone,
    transporting the conveying module having information written in the control device to a construction site; and
    coupling the zones according to the layout designed by the CAD device.

22. A conveyor for conveying an object from a start position to a target place,
    the conveyor comprising:
    a plurality of zones into which the conveyer is divided, each of the zones comprising:
    a linear conveying zone linearly conveying the object; and
    a conveying direction changing zone selecting a conveying direction of the object to send out the object in the selected conveying direction;
    a region where the conveyor conveys the object across the zones;
    a zone controller for controlling one or more of the zones, comprising:
    a conveyance destination storage unit temporarily storing a conveyance destination information of the object itself;
    an information receiving unit receiving the conveyance destination information from an upstream zone; and
    an information transmitting unit transmitting the conveyance destination information to a downstream zone;
    at least one object identifying device; and
    an initial information transmitting unit transmitting the conveyance destination information of the object to any of the zones,
    wherein the conveyor transfers the conveyance destination information from the zone controller that controls the upstream zone to the zone controller that controls the downstream zone as an incident of detected movement of the object.

23. The conveyor according to claim 22,
    wherein the linear conveying zone individually has power to allow the linear conveying zone to be driven and stopped independently from the other zones,
    wherein the linear conveying zone includes a load presence sensor that detects whether the object is present thereon, and
    wherein the conveyance destination information stored in the conveyance destination storage unit is deleted and/or rewritten on the basis of whether the linear conveying zone has been driven and whether the load presence sensor has detected presence of the object.

24. The conveyor according to claim 22,
    wherein the linear conveying zone individually has power to allow the linear conveying zone to be driven and stopped independently from the other zones, wherein the linear conveying zone includes a load presence sensor that detects whether the object is present thereon, and wherein the conveyance destination information stored in the conveyance destination storage unit is rewritten when the linear conveying zone has been driven and the load presence sensor has changed from a state of not detecting the presence of the object to a state of detecting the presence of the object.

25. A zone controller used in a conveyor, the conveyor comprising:

a plurality of zones into which the conveyor divided, an object being conveyed across the zones;

a motor in each of the zones; and a load presence sensor detecting whether the object is present on the zone, the zone controller for controlling one or more of the zones and for supplying power to the motor, comprising:

a conveyance destination storage unit temporarily storing conveyance destination information of the object;

an information receiving unit receiving the conveyance destination information from an upstream zone; and an information transmitting unit transmitting the conveyance destination information to a downstream zone, the zone controller being capable of inputting a signal of the load presence sensor, wherein the zone controller rewrites the conveyance destination information stored in the conveyance destination storage unit when the motor of the zone controlled by the zone controller has been driven and the load presence sensor has changed from a state of not detecting the presence of the object to a state of detecting the presence of the object.

26. A conveying module comprising:

a mechanical structure placing an object thereon to convey the object; and a controller controlling the mechanical structure, the mechanical structure and the controller being integrated with each other, wherein the mechanical structure comprises a direction changing mechanism that switches a conveying direction or a carrying-in direction to allow the mechanical structure to carry in the object from one or more of the carrying-in directions and to carry out the object to one or more of the conveying directions, wherein the controller comprises a control unit for introducing the object, a control unit for operating the direction changing mechanism, and a control unit for discharging the object, and wherein the controller further comprises an information receiving unit receiving conveyance destination information of the object itself from the controller in another of the conveying module as an incident of detecting movement of the object and operates the direction changing mechanism on the basis of each information received by the information receiving unit.

27. A zone controller used in a conveyor, the conveyor comprising:

a plurality of zones into which the conveyor divided, an object being conveyed across the zones;

a motor in each of the zones; and a load presence sensor detecting whether the object is present on the zone, the zone controller for controlling one or more of the zones and for supplying power to the motor, comprising:

a conveyance destination storage unit temporarily storing conveyance destination information of the object;

an information receiving unit receiving the conveyance destination information from an upstream zone; and an information transmitting unit transmitting the conveyance destination information to a downstream zone, the zone controller being capable of inputting a signal of the load presence sensor, wherein the conveyance destination information stored in the conveyance destination storage unit is deleted and/or rewritten on the basis of whether the motor of the zone has been driven and whether the load presence sensor has detected presence of the object.

* * * * *